US005886159A

United States Patent [19]

Kunimi et al.

[11] Patent Number: 5,886,159

[45] **Date of Patent: *Mar. 23, 1999**

[54] BISAZO COMPOUND AND METHOD FOR DYEING OR PRINTING FIBROUS MATERIALS USING THE SAME

[75] Inventors: Nobutaka Kunimi, Toyonaka; Kouji Toishi, Hannan, both of Japan

[73] Assignee: Sumitomo Chemical Company, Limited, Osaka, Japan

[ * ] Notice: The term of this patent shall not extend beyond the expiration date of Pat. No. 5,145,842.

[21] Appl. No.: 912,670

[22] Filed: Aug. 18, 1997

[30] Foreign Application Priority Data

Aug. 23, 1996 [JP] Japan .................................... 8-222138
May 26, 1997 [JP] Japan .................................... 9-135258

[51] Int. Cl.$^6$ ......................... C09B 62/09; C09B 62/513; D06P 1/38

[52] U.S. Cl. .......................... 534/605; 534/612; 534/634; 534/637; 534/642

[58] Field of Search .................................... 534/605, 612, 534/634, 637, 642

[56] References Cited

FOREIGN PATENT DOCUMENTS

| | | |
|---|---|---|
| 54-73827 | 6/1979 | Japan . |
| 54-81335 | 6/1979 | Japan . |
| 59-6260 | 1/1984 | Japan . |
| 60-69163 | 4/1985 | Japan . |
| 60-260657 | 12/1985 | Japan . |
| 62-132966 | 6/1987 | Japan . |
| 62-132967 | 6/1987 | Japan . |
| 63-68669 | 3/1988 | Japan . |
| 2-274769 | 11/1990 | Japan . |
| 4-314761 | 11/1992 | Japan . |
| 5-125288 | 5/1993 | Japan . |
| 5-507307 | 10/1993 | Japan . |
| 6-212085 | 8/1994 | Japan . |
| 7-82501 | 3/1995 | Japan . |
| 7-331100 | 12/1995 | Japan . |

OTHER PUBLICATIONS

Dyes Pigm., 1995, vol. 29(1), pp. 1–21, see dye No. 30 (table 8, p. 17; ie RN 97629–51–5).

Dyes Pigm., 1993, Volumn Date 1992, vol. 20(4), pp. 227–246, see dye No. 29 (table 8, p. 242).

J. Soc. Dyers Colour., 1988, vol. 104(11), pp. 425–431, see compound 4 (p. 426, formula drawing; ie RN 97629–51–5).

Chemical Abstracts, abstr No. 103:72613 (1985) & JP600069163 A2 19 Apr. 1985 (Sumitomo Chemical), see abstract and compounds RN 97629–49–7, 97629–50–0 & 97629–51–1.

Chemical Abstracts, 123: 11818g (1995) Abstract of Ger. Offen. DE 4,424,733.

*Primary Examiner*—Fiona T. Powers
*Attorney, Agent, or Firm*—Stevens, Davis, Miller & Mosher, L.L.P.

[57] ABSTRACT

A bisazo compound represented by the following general formula (I) or its salt is a useful fiber-reactive dye:

(I)

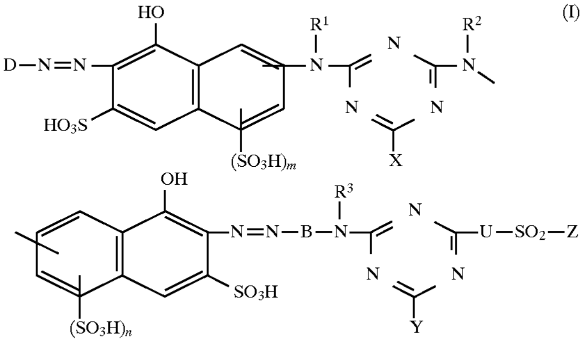

where D is a phenyl or naphthyl group; B is a phenylene group, etc.; U is an aliphatic or aromatic linking group; Z is a vinyl group, etc.; and X and Y are a halogen atom, a pyridinio group, etc.

17 Claims, No Drawings

BISAZO COMPOUND AND METHOD FOR DYEING OR PRINTING FIBROUS MATERIALS USING THE SAME

BACKGROUND OF THE INVENTION

1) Field of the Invention

The present invention relates to a fiber-reactive bisazo compound.

2) Related Art

Various reactive dyes have been so far known and widely used in the field of dyeing and printing of fibrous materials. For example, bisazo compounds are known as fiber-reactive red dyes from JP-A 54(1979)-73827, 5(1993)-125288, etc.

As a result of extensive studies to develop reactive dyes capable of giving red-dyed fibrous materials having better dyeability at a low salt concentration, and better reproducibility, levelling property, build-up property, effective dyeing ratio, wash-off property, etc. and also better color fastnesses to chlorine, light, sweat, sweat and sun light, acid hydrolysis, alkali, washing, peroxide washing, etc. in the dyeing or printing of fibrous materials than the above-mentioned known dyes, the present inventors have found that a bisazo compound having two triazine rings and at least one vinylsulfon type reactive group had the desired properties as mentioned above and have established the present invention.

SUMMARY OF THE INVENTION

An object of the present invention is to provide a bisazo compound represented by the following general formula (I) and its salts:

(I)

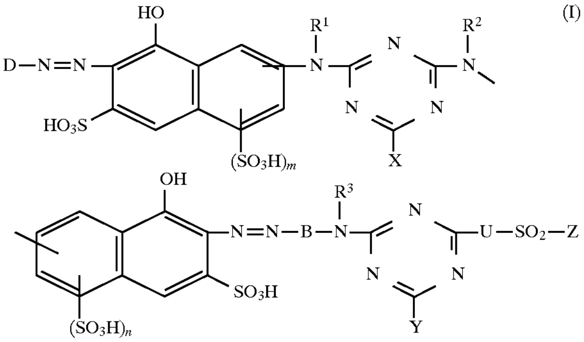

where m and n each independently represents 0 or 1; $R^1$, $R^2$ and $R^3$ each independently represent a hydrogen atom or an alkyl group which may be substituted; D represents a phenyl group which may be substituted or a naphthyl group which may be substituted; B represents a group represented by the following general formula (II) or (III):

(II)

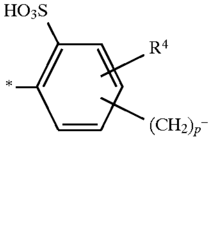

-continued (III)

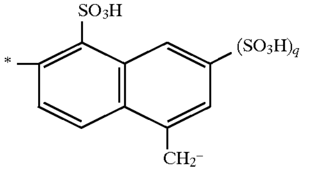

(where an asterisk * represents a bond linking to the azo group; $R^4$ represents a hydrogen atom, a lower alkyl group, a lower alkoxy group or a sulfo group; and p and q each independently represent 0 or 1), U represents a linking group represented by the following general formula (U1), (U2), (U3) or (U4):

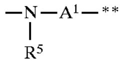

(U1)

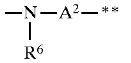

(U2)

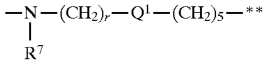

(U3)

(U4)

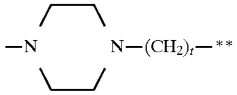

(where $R^5$, $R^6$ and $R^7$ each independently represent a hydrogen atom or a alkyl group which may be substituted; $A^1$ represents a phenylene group which may be substituted or a naphthylene group which may be substituted; $A^2$ represents an alkylene group which may be substituted; $Q^1$ represents —O—, —S— or —$NR^8$—, where $R^8$ represents a hydrogen atom, an alkyl group which may be substituted or a phenyl group which may be substituted; r and s each independently represent 2, 3 or 4; t represents an integer of 1 to 6; and a double asterisk ** represents a bond linking to —$SO_2Z$), Z represents —$CH{=}CH_2$ or —$CH_2CH_2Z^1$, where $Z^1$ represents a group removable by the action of an alkali; and X and Y each independently represent a halogen atom, a pyridinio group which may be substituted or a group represented by the following general formula (Y1),(Y2), (Y3) or (Y4):

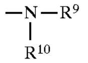

(Y1)

(Y2)

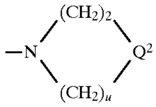

$—O—R^{11}$ (Y3)

$—S—R^{12}$ (Y4)

(where $R^9$, $R^{10}$, $R^{11}$ and $R^{12}$ each independently represent a hydrogen atom, an alkyl group which may be substituted, a cyclohexyl group which may be substituted, a phenyl group which may be substituted or a naphthyl group which may be substituted; $Q^2$ represents —$CH_2$—, —O—, —S—, —$SO_2$— or —$NR^{13}$—, where $R^{13}$ represents a hydrogen atom or an alkyl group which may be substituted; and u represents 1, 2 or 3).

Another object of the present invention is to provide a method for dyeing or printing fibrous materials with a bisazo compound represented by the foregoing general formula (I) or its salts.

The present invention will be described in detail below.

DETAILED DESCRIPTION OF THE INVENTION

The present bisazo compound can be represented by the foregoing general formula (I), where m and n each independently represent 0 or 1.

Z represents —CH═$CH_2$ or —$CH_2CH_2Z^1$, where $Z^1$ represents a group removable by the action of an alkali.

$Z^1$ specifically includes, for example, groups of sulfate esters, thiosulfate esters, phosphate esters, acetate esters, etc., a halogen atom, etc., among which groups sulfate esters and a chloro group are preferable.

Preferable specific examples of Z include —CH═$CH_2$, —$CH_2CH_2Cl$, —$CH_2CH_2OSO_3H$, etc., among which —$CH_3CH_2OSO_3H$ is particularly preferable.

In the present bisazo compound (I), $R^1$, $R^2$ and $R^3$ each independently represent a hydrogen atom or an alkyl group which may be substituted. The alkyl group preferably has 1 to 4 carbon atoms, and the substituents for the alkyl group include, for example, a hydroxy group, a halogen atom, an alkoxy group having 1 to 4 carbon atoms, a cyano group, a carbamoyl group, a carboxyl group, an alkoxycarbonyl group whose alkoxy group has 1 to 4 carbon atoms, an alkylcarbonyloxy group whose alkyl group has 1 to 4 carbon atoms, a sulfo group, a sulfamoyl group, etc.

The alkyl group and the alkoxy group having 1 to 4 carbon atoms, alkoxycarbonyl group whose alkoxy group has 1 to 4 carbon atoms and alkylcarbonyloxy group whose alkyl group has 1 to 4 carbon atoms as substituents for the alkyl group may be in a straight chain or branched chain form.

Specific examples of the alkyl group which may be substituted and is represented by $R^1$, $R^2$ and $R^3$ include methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanoproyl, methoxymethyl, ethoxymethyl, 2-metoxyethyl, 2-ethoxyethyl, 3-methoxyproyl, 3-ethoxypropyl, 2-hydroxy-3-methoxypropyl, chloromethyl, bromomethy, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxy-carbonylethyl, 2-ethoxycarbonylethyl, 3-methoxycarbonyl-propyl, 3-ethoxycarbonylpropyl, 4-methoxycarbonylbutyl, 4-ethoxycarbonylbutyl, methylcarbonyloxymethyl, ethyl-carbonyloxymethyl, 2-methylcarbonyloxyethyl, 2-ethylcarbonyoxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl, etc.

Preferable $R^1$, $R^2$ and $R^3$ each independently are a hydrogen atom or an unsubstituted alkyl group, among which a hydrogen atom, methyl and ethyl are particularly preferable.

In the present bisazo compound (I), D represents a phenyl group which may be substituted or a naphthyl group which may be substituted.

The substituents on the phenyl and naphthyl groups include, for example, a straight or branched alkyl group having 1 to 4 carbon atoms, an alkoxy group having 1 to 4 carbon atoms, a carboxy group, a sulfo group, a hydrogen atom, a nitro group, —$SO_2CH$═$CH_2$, —$SO_2CH_2CH_2Z^2$, etc., where $Z^2$ represents a group releasable under an alkali action and specifically include, for example, groups of sulfate esters, thiosulfate esters, phosphate esters, acetate esters, etc., a hologeno group, etc., among which a sulfate ester group and a chloro group are preferable.

D is preferably a phenyl or naphthyl group having at least one substituent selected from the group consisting of —$SO_2CH$═$CH_2$, —$SO_2CH_2CH_2Z^2$ and a sulfo group, where $Z^2$ has the same meanings as defined above. In that case, the substituted phenyl or naphthyl group may further have another substituent or other substituents as given above, for example, an alkyl group having 1 to 4 carbon atoms, etc.

The phenyl group as represented by D specifically includes an unsubstituted phenyl group or a substituted phenyl group having 1, 2 or 3 substituents selected from the group consisting of an alkyl group having 1 to 4 carbon atoms, an alkoxy group having 1 to 4 carbon atoms, a carboxy group, a sulfo group, a halogeno group, a nitro group, —$SO_2CH$═$CH_2$ and —$SO_2CH_2CH_2Z^2$ where $Z^2$ has the same meanings as defined above, among which groups represented by the following general formulae (D1) and (D2) in a free acid form are preferable:

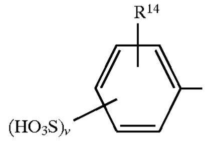

(D1)

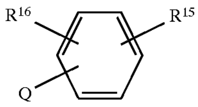

(D2)

where $R^{14}$ represents a hydrogen atom, an alkyl group having 1 to 4 carbon atoms, an alkoxy group having 1 to 4 carbon atoms or a carboxy group; v represents 1 or 2; $R^{15}$ and $R^{16}$ each independently represent a hydrogen atom, an alkyl group having 1 to 4 carbon atoms, an alkoxy group having 1 to 4 carbon atoms, a carboxy group, a sulfo group, or a halogeno group; and Q represents —$SO_2CH$═$CH_2$ or —$SO_2CH_2CH_2Z^2$, where $Z^2$ has the same meanings as defined above.

The phenyl group represented by the general formula (D1) includes the following ones:

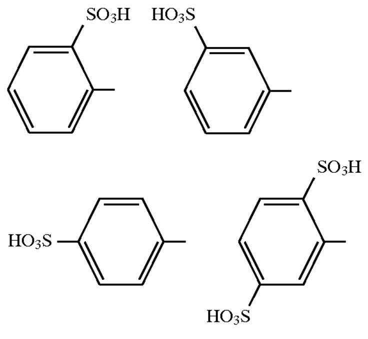

-continued
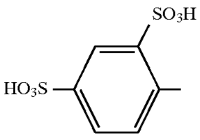
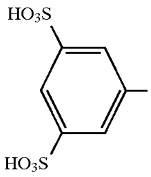
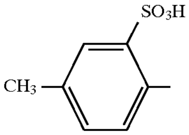
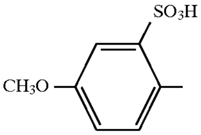
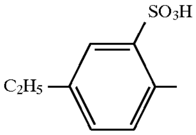
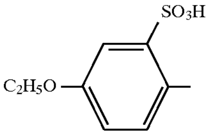
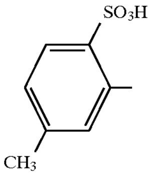
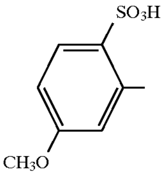
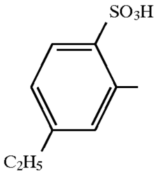
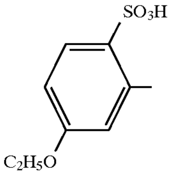
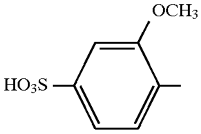
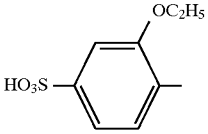
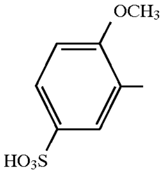
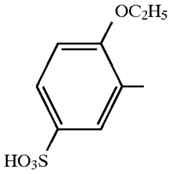
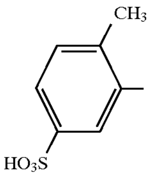
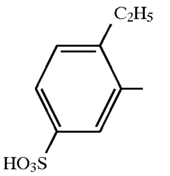
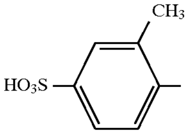
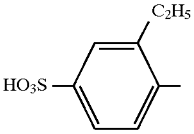
-continued
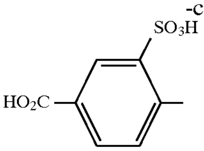
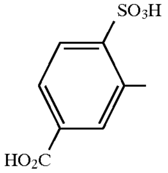
The phenyl group represented by the general formula (D2) includes the following ones:
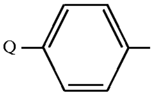
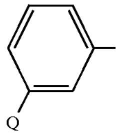
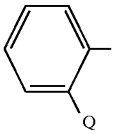
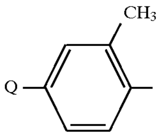
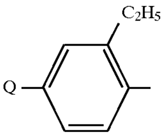
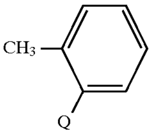
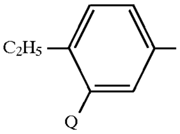
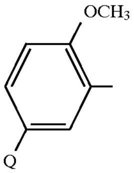
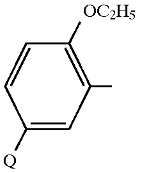
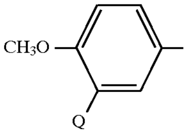
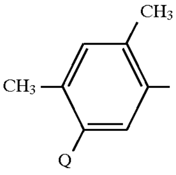
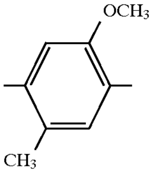
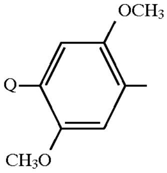
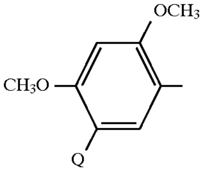
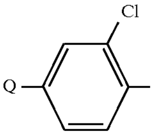
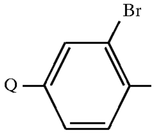

-continued

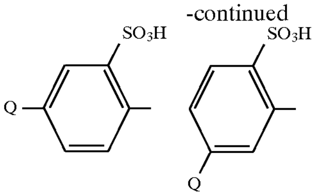

where Q has the same meanings as defined above.

Among the phenyl groups defined by the general formulae (D1) and (D2), the phenyl group of the general formula (D1) whose $R^{14}$ is a hydrogen atom, methyl, methoxy or carboxy and the phenyl group of the general formula (D2) whose $R^{15}$ and $R^{16}$ each independently are a hydrogen atom, methyl, methoxy or sulfo and whose Q is $—SO_2CH_2CH_2OSO_3H$ are particularly preferable. Among the general formulae (D1) and (D2), the latter is preferable.

The naphthyl group represented by D preferably includes an unsubstituted naphthyl group or a substituted naphthyl group having 1, 2 or 3 substituents selected from the group consisting of $—SO_2CH{=}CH_2$, $—SO_2CH_2CH_2Z^2$ and a sulfo group, where $Z^2$ has the same meanings as defined above, among which the naphthyl group represented by the following general formula (D3) or (D4) in a free acid form is preferable:

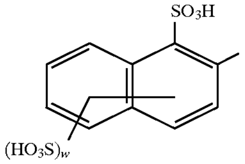

(D3)

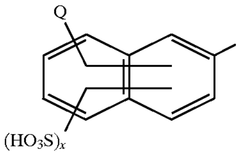

(D4)

where w represents 1 or 2; x represents 0 or 1; and Q has the same meanings as defined above.

The naphthyl group represented by the general formula (D3) includes the following ones:

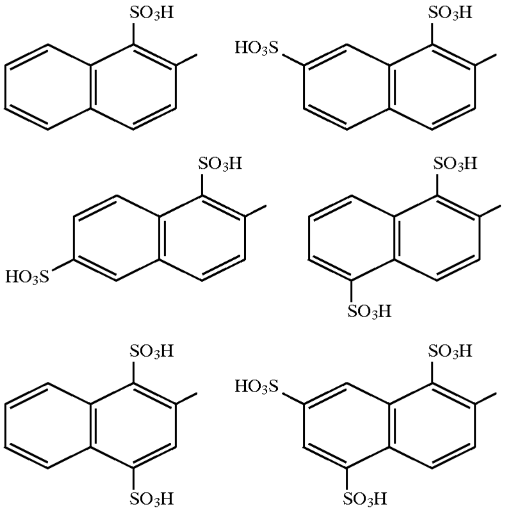

The naphthyl group represented by the general formula (D4) includes the following ones:

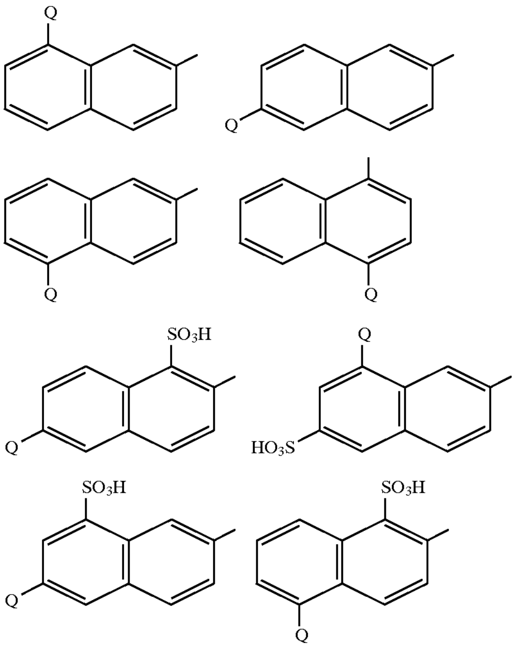

where Q has the same meanings as defined above.

Among the naphthyl groups represented by the general formula (D4), naphthyl groups whose Q is $—SO_2CH_2CH_2OSO_3H$ and which have a sulfo group as a substituent are particularly preferable.

In the present bisazo compound (I), B represents a group represented by the foregoing general formula (II) or (III); p and q each independently represent 0 or 1; asterisk * represents a bond linking to the azo group; and $R^4$ represents a hydrogen atom, a lower alkyl group, a lower alkoxy group or a sulfo group, where the lower alkyl group or lower alkoxy group incudes, for example, methyl, ethyl, n-propyl, isopropyl, n-butyl, isobutyl, sec-butyl, methoxy, ethoxy, n-propoxy, isopropoxy, n-butoxy, isobutoxy, sec-butoxy, etc.

Specific examples of the group represented by B include the following ones:

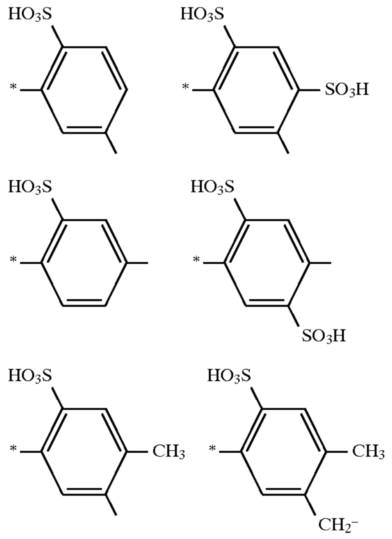

-continued

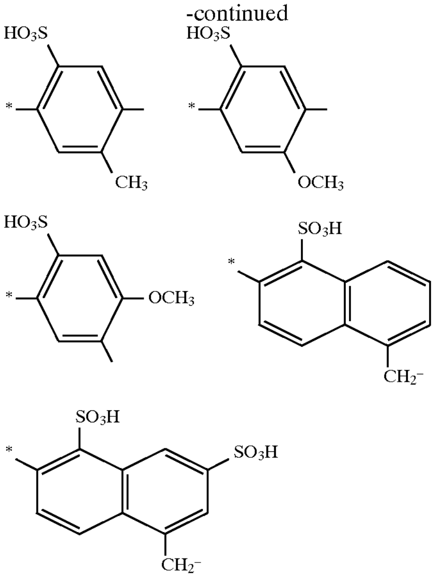

where asterisk * represents a bond linking to the azo group.

Above all, 2-sulfo-1,5-phenylene, which links to the azo group at 1-position, etc. are particularly preferable.

In the present bisazo compound (I), U represents a linking group represented by the foregoing formula (U1), (U2), (U3) or (U4), where $R^5$, $R^6$ and $R^7$ each independently represent a hydrogen atom or an alkyl group which may be substituted, and which includes the same groups which may be substituted, as given by the foregoing $R^1$, $R^2$ and $R^3$. Preferably, $R^5$, $R^6$ and $R^7$ each independently represent a hydrogen atom, methyl or ethyl, and particularly preferably $R^6$ and $R^7$ each are a hydrogen atom.

In the formula (U1) for U, $A^1$ represents a phenylene group which may be substituted or a naphthylene group which may be substituted.

Such a phenylene group which may be substituted includes, for example, phenylene groups, each of which may be substituted one or two substituents selected from the group consisting of an alkyl group having 1 to 4 carbon atoms, an alkoxy group having 1 to 4 carbon atoms, a sulfo group and a halogen atom.

Preferable phenylene groups include phenylene groups which may be substituted by one or two substituents selected from the group consisting of methyl, ethyl, methoxy, ethoxy, chloro, bromo and sulfo. Specific examples of the phenylene group include the following ones:

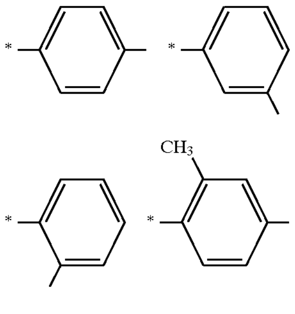

-continued

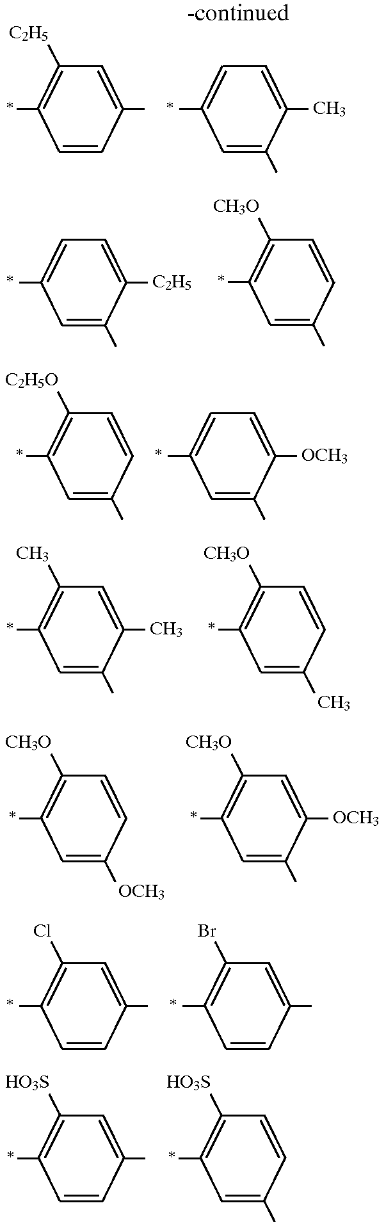

where the bond indicated by asterisk * means a bond linking to —$NR^5$— (where $R^5$ has the same meanings as defined above).

Above all, phenylene groups having one or two substituents selected from the group consisting of methyl and methoxy are particularly preferable.

In the general formula (U1), the naphthylene group which may be substituted and is represented by $A^1$ includes naphthylene groups, each of which may be substituted by one or two substituents selected from the group consisting of an alkyl group having 1 to 4 carbon atoms, an alkoxy group having 1 to 4 carbon atoms, a sulfo group and a halogen atom.

The naphthylene group which may be subsituted and is represented by $A^1$ is preferably a naphthylene group which may be substituted by one or two sulfo groups. Specific examples of such naphthylene group include the following ones:

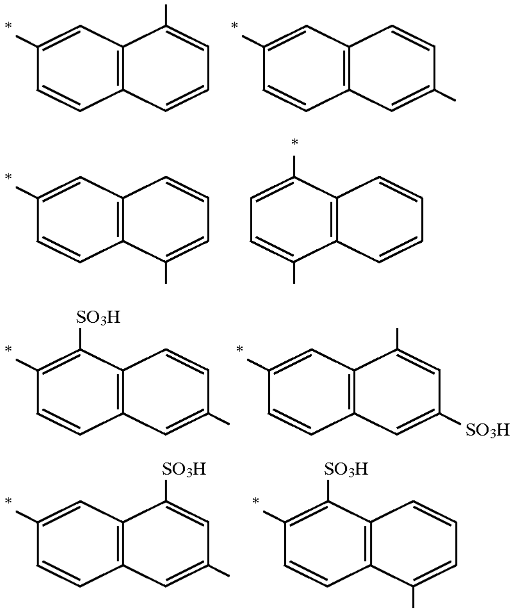

where the bond indicated by asterisk * means a bond linking to —$NR^5$— (where $R^5$ has the same meanings as defined above).

$A^1$ preferably represents a phenylene group which may be substituted, particularly phenylene group which may have one or two substitutents selected from the group consisting of methyl and methoxy.

In the formula (U2), $A^2$ represents an alkylene group which may be substituted and includes, for example, alkylene groups having 2 to 4 carbon atoms, each of which may be substituted by a substituent selected from the group consisting of an alkyl group having 1 to 4 carbon atoms, a halogen atom, a hydroxy group, a sulfo group, a cyano group, an alkoxy group having 1 to 4 carbon atoms, an alkoxycarbonyl group whose alkoxy group has 1 to 4 carbon atoms, an alkylcarbonyloxy group whose alkyl group has 1 to 4 carbon atoms and a carbamoyl group.

The alkylene group which may be substituted and is represented by $A^2$ preferably includes an unsubstituted alkylene group having 2 to 4 carbon atoms, particularly preferably ethylene and trimethylene.

In the formula (U3), $Q^1$ represents —O—, —S— or —$NR^8$—, where $R^8$ represents a hydrogen atom, an alkyl group which may be substituted or a phenyl group which may be substituted.

The alkyl group which may be substituted and is represented by $R^8$ includes, for example the same alkyl groups having 1 to 4 carbon atoms as represented by $R^1$, $R^2$ and $R^3$.

The phenyl group which may be substituted and is represented by $R^8$ includes, for example, a phenyl group which may have a sulfo group. $R^8$ is preferably a hydrogen atom, methyl or ethyl as a substituent.

In the general formula (U3), r and s each independently represent 2, 3 or 4.

The group of the general formula (U3) whose $Q^1$ is —O— and whose r and s each independently are 2 or 3 is preferable and preferably includes the following groups:

#—$CH_2CH_2$—O—$CH_2CH_2$—

#—$CH_2CH_2$—O—$CH_2CH_2CH_2$—

#—$CH_2CH_2CH_2$—O—$CH_2CH_2$—

#—$CH_2CH_2CH_2$—O—$CH_2CH_2CH_2$— where the bond indicated by parallel cross mark # means a bond linking to —$NR^8$— (where $R^8$ has the same meanings as defined above).

Above all, the group #—$CH_2CH_2$—O—$CH_2CH_2$— is particularly preferable, where the parallel cross mark # has the same meaning as defined above.

In the formula (U4), t represents an integer of 1 to 6, preferably 2, 3 or 4.

Among the linking groups represented by U, those represented by the general formula (U1) and (U2) are preferable. Above all, those represented by the general formula (U2) are particularly preferable.

Furthermore, the linking group of the general formula (U1) whose $A^1$ is a phenylene group which may be substituted, particularly a phenylene group which may be substituted by one or two substituents selected from the group consisting of methyl and methoxy and whose $R^5$ is a hydrogen atom, methyl or ethyl is preferable.

Furthermore, the linking group of the general formula (U2) whose $A^2$ is ethylene or trimethylene and whose $R^6$ is a hydrogen atom, methyl or ethyl, particularly a hydrogen atom, is preferable.

In the present bisazo compound (1), X and Y each independently represent a halogeno group, a pyridinio group which may be substituted or a group represented by the general formula (Y1), (Y2), (Y3) or (Y4), where the halogen atom includes, for example, fluoro, chloro, bromo, etc.

The pyridinio group which may be substituted includes, for example, pyridinio groups which may be substituted by a substituent selected from the group consisting of a carboxy group, a carbamoyl group, a sulfo group, a halogen atom and an alkyl group having 1 to 4 carbon atoms which may be substituted where the alkyl group having 1 to 4 carbon atoms which may be substituted includes, for example, 2-hydroxyethyl, 2-sulfoethyl, etc.

Specific examples of the pyridinio group include, for example, pyridinio, 2-, 3- or 4-caboxy-pyridinio, 2-, 3- or 4-carbamoylpyridinio, 3-sulfo-pyridinio, 4-(2-sulfoethyl) pyridinio, 3-(2-hydroxy-ethyl)pyridinio, 4-chloropyridinio, 3-methylpyridinio, 3,5-dicarboxypyridinio, etc., preferably carboxy- or carbamoyl-substituted pyridinio, particularly preferably 3- or 4-carboxypyridinio.

In the group represented by the general formula (Y1), (Y3) or (Y4), $R^9$, $R^{10}$, $R^{11}$ and $R^{12}$ each independently represent a hydrogen atom, an alkyl group which may be substituted, a cyclohexyl group which may be substituted, a phenyl group which may be substituted or a naphthyl group which may be substituted.

The alkyl group which may be substituted includes, for example, alkyl groups having 1 to 4 carbon atoms, each of which may have one or two substituents selected from the group consisting of an alkoxy group having 1 to 4 carbon atoms, a sulfo group, a carboxy group, a sulfamoyl group, a carbamoyl group, a hydroxy group, a halogen atom, a cyano group, a carboxylate ester group, a sulfonate ester group, a phenyl group which may be substituted and a sulfate group. The cyclohexyl group which may be substituted includes, for example, an unsubstituted cyclohexyl group, a methyl- or hydroxyl-substituted cyclohexyl group, etc. The phenyl group which may be substituted includes, for example, phenyl groups, each of which may have one or two substituents selected from the group consisting of an alkyl group having 1 to 4 carbon atoms, an alkoxy group having 1 to 4 carbon atoms, a sulfo group and a halogen atom.

Specific examples of the alkyl group which may be substituted and is represented by $R^9$, $R^{10}$, $R^{11}$ and $R^{12}$ includes, benzyl, etc. which may be substituted, besides the alkyl group represented by $R^1$, $R^2$ and $R^3$.

The alkyl group which may be substituted preferably includes, for example, methyl, ethyl, n-propyl, isopropyl, n-butyl, isobutyl, sec-butyl, 2-hydroxyethyl, 2-sulfoethyl, 2-methoxyethyl, 2-carboxyethyl, 2-carbamoylethyl, 2-sulfamoylethyl, benzyl, 2-, 3- or 4-sulfobenzyl, etc.

In the group represented by the general formula (Y1), (Y3), and (Y4), the phenyl group which may be substituted and is represented by $R^9$, $R^{10}$, $R^{11}$ or $R^{12}$ includes, for example, phenyl groups which may be substituted by one or two substituents selected from the group consisting of an alkyl group having 1 to 4 carbon atoms, an alkoxy group having 1 to 4 carbon atoms, a sulfo group, a carboxy group, a halogeno group, a hydroxy group, a cyano group, a carbamoyl group, a sulfamoyl group, a carboxylate ester group, a 2-hydroxyethylsulfonyl group, an amino group, an acylamino group and an amino group having an alkyl group having 1 to 4 carbon atoms as a substituent.

Preferable specific examples of the phenyl group include, for example, phenyl, 2-, 3- or 4-methylphenyl, 2-, 3- or 4-methoxyphenyl, 2-, 3- or 4-ethylphenyl, 2-, 3- or 4-ethoxyphenyl, 2-, 3- or 4-carboxyphenyl, 2-, 3- or 4-chlorophenyl, 2-, 3- or 4-sulfophenyl, 2-sulfo-4-methoxyphenyl, 2-, 3- or 4-hydroxyphenyl, etc.

In the group represented by the general formula (Y1), (Y3) or (Y4), the naphthyl group which may be substituted and is represented by $R^9$, $R^{10}$, $R^{11}$ or $R^{12}$ includes, for example, a naphthyl group which may be substituted by 1, 2 or 3 substituents selected from the group consisting of an alkyl group having 1 to 4 carbon atoms, an alkoxy group having 1 to 4 carbon atoms, a sulfo group, a carboxy group, a halogeno group and a hydroxy group.

Preferable specific examples of the naphthyl group include, for example, 2-, 3-, 4-, 5-, 6-, 7- or 8-sulfo-1-naphthyl, 1-, 5-, 6-, 7- or 8-sulfo-2-naphthyl, 1,5-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl, etc.

In the group represented by the general formula (Y2), $Q^2$ represents $—CH_2—$, —O—, —S—, $—SO_2—$ or $—NR^{13}—$, where $R^{13}$ represents a hydrogen atom or an alkyl group which may be substituted and includes, for example, a hydrogen atom, an alkyl group having 1 to 4 carbon atoms, and an alkyl group having 1 to 4 carbon atoms which may be substituted by an alkoxy group having 1 to 4 carbon atoms. $R^{13}$ is particularly preferably a hydrogen atom, methyl or ethyl.

In the general formula (Y2), u represents an integer of 1, 2 or 3.

Specific examples of the group represented by the general formula (Y2) include, for example, pyrrolidino, piperidino, piperazino, n-alkylpiperazino, morpholino, etc. Above all, the group of (Y2) whose $Q^2$ is $—CH_{2-}$ or —O— and whose u is 2, that is, piperidino and morpholino, is particularly preferable.

In case of the group represented by the general formula (Y1) in the present bisazo compound (I), when X and/or Y is given by $—NR^9R^{10}$, for example, the following amine compounds a), b) and c), i.e. $HNR^9R^{10}$, can be used to form the group (Y1).

a) Ammonia, b) Aromatic amines such as 1-aminobenzene, 1-amino-2, -3- or -4-methylbenzene, 1-amino-2,4-, -3,4- or -3,5-dimethylbenzene, 1-amino-2-, -3- or -4-ethyl-benzene, 1-amino-2-, -3- or -4-methoxybenzene, 1-amino-2-, -3- or -4-ethoxybenzene, 1-amino-2-, -3- or -4-chlorobenzene, 1-amino-2-, -3- or -4-bromobenzene, 1-amino-2-, -3- or -4-fluorobenzene, 3- or 4-aminophenyl-methanesulfonic acid, 2-, 3- or 4-aminobenzenesulfonic acid, 3- or 4-methylaminobenzenesulfonic acid, 3- or 4-ethylaminobenzenesulfonic acid, 5-aminobenzene-1,3-disulfonic acid, 6-aminobenzene-1,3- or 1,4-disulfonic acid, 4-aminobenzene-1,2-disulfonic acid, 4-amino-5-methylbenzene-1,2-disulfonic acid, 2-, 3- or 4-amino-benzoic acid, 5-aminobenzene-1,3-dicarboxylic acid, 5-amino-2-hydroxybenzenesulfonic acid, 4-amino-2-hyroxy-benzenesulfonic acid, 5-amino-2-ethoxybenzenesulfonic acid, N-methylaminobenzene, N-ethylaminobenzene, 1-methylamino-3- or -4-methylbenzene, 1-ethylamino-3- or -4-methylbenzene, 1-methylamino-2-, -3- or -4-chloro-benzene, 1-ethylamino-2-, -3- or -4-chlorobenzene, 1-(2-hydroxyethyl) amino-3-methylbenzene, 3- or 4-methyl-aminobenzoic acid, 1-amino-2-methoxy-5-methylbenzene, 1-amino-2,5-dimethoxybenzene, 2-, 3- or 4-aminophenol, 1-amino-3- or -4-acetylaminobenzene, 2,4- or 2,5-diamino-benzenesulfonic acid, 1-aminobenzene-3- or 4-(2-hydroxy-ethylsulfone), 2-, 4-, 5-, 6-, 7- or 8-aminonaphthalene-1-sulfonic acid, 1-, 4-, 5-, 6-, 7- or 8 -amino-naphthalene-2-sulfonic acid, 7-methylaminonaphthalene-2-sulfonic acid, 7-ethylaminonaphthalene-2-sulfonic acid, 7-butylaminonaphthalene-2-sulfonic acid, 7-isobutyl-aminonaphthalene-2-sulfonic acid, 4-, 5-, 6-, 7- or 8-aminonaphthalene-1,3-disulfonic acid, 2-, 3- or 4-amino-naphthalene-1,5-disulfonic acid, 4- or 8-aminonaphthalene-1,6-disulfonic acid, 4-aminonaphthalene-1,7-disulfonic acid, 3- or 4-aminonaphthalene-2,6-disulfonic acid, 3- or 4-aminonaphthalene-2,7-disulfonic acid, 6-or 7-aminonaphthalene-1,3,5-trisulfonic acid, 4-, 7- or 8-aminonaphthalene-1,3,6-trisulfonic acid, 4-amino-naphthalene-1,3,7-trisulfonic acid, etc., and c) Aliphatic amines such as methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylamino-ethanol, bis(2-hydroxyethyl)amine, 2-acetylaminoethyl-amine, 1-amino-2-propanol, 3-methoxypropylamine, 1-amino-3-dimethylaminopropane, 2-aminoethanesulfonamide, 2-aminoethanesulfonic acid, aminomethanesulfonic acid, 2-methylaminoethanesulfonamide, 2-methylaminoethane-sulfonic acid, 3-amino-1-propanesulfonic acid, 2-sulfateethylamine, aminoacetic acid, methylaminoacetic acid, 3-aminopropionic acid, 3-aminopropionamide, 3-methylaminopropionic acid, 3-methylaminopropionamide, ϵ-aminocaproic acid, benzylamine, 2-, 3- or 4-sulfobenzyl-amine, 2-, 3- or 4-chlorobenzylamine, 2-, 3- or 4 -methylbenzylamine, N-methylbenzylamine, 1-phenylethyl-amine, 2-phenylethylamine, 1-phenyl-2-propylamine, etc.

Particularly preferable examples of amine compounds represented by the formula $HNR^9R^{10}$ include, for example, aniline, N-methylaniline, N-ethylaniline, 2-, 3- o 4-chloroaniline, N-methyl-2-, -3- or -4-chloroaniline, N-ethyl-2-, -3- or -4-chloroaniline, 2-, 3- or 4-methylaniline, 2-, 3- or 4-ethylaniline, 2-, 3- or 4-methoxyaniline, 2-, 3- or 4-ethoxyaniline, 2-, 3- or 4-hydroxyaniline, aniline-2-, 3- or 4-sulfonic acid, 3- or 4-methylaminobenzenesulfonic acid, 3- or 4-ethyl-aminobenzensulfonic acid, 2-, 3- or 4-carboxyaniline, ammonia, methylamine, ethylamine, dimethylamine, taurine, N-methyltaurine, mono- or di-ethanolamine, 2-sulfamoylethylamine and 2-carbamoylethylamine.

Above all, particularly preferable are aniline, N-methylaniline, N-ethylaniline, 2-, 3- or 4-chloroanilie, N-methyl-2-, -3- or -4-chloroaniline, N-ethyl-2-, -3- or -4-chloroaniline, 2-, 3- or 4-methyl-aniline, 2-, 3- or 4-ethylaniline, 2-, 3- or 4-methoxy-aniline, 2-, 3- or 4-ethoxyaniline, 2-, 3- or 4-hydroxy-aniline, aniline-2-, -3- or -4-sulfonic acid, 3- or 4-methylaminobenzenesulfonic acid, 3- or 4-ethylamino-benzenesulfonic acid, 2-, 3- or 4-carboxyaniline, etc.

Furthermore, when X and/or Y is the group represented by the general formula (Y1), one of the groups represented by $R^9$ and $R^{10}$ is preferably a phenyl group which may be substituted, and more preferably $R^9$ is a hydrogen atom, methyl or ethyl and $R^{10}$ is a phenyl group which may be substituted by a substituent selected from the group consisting of an alkyl group having 1 to 4 carbon atoms, an alkoxy group having 1 to 4 carbon atoms, a sulfo group, a carboxy group, a halogen atom, a hydroxy group, a cyano group and an acylamino group.

When X and/or Y is represented by the general formula (Y3), i.e. —O—$R^{11}$, for example, the following compounds d) and e) i.e. $HOR^{11}$, are used to form the —$OR^{11}$ group:

d) Phenols and naphthols such as phenol, 1-hydroxy-2-, -3- or -4-methylbenzene, 1-hydroxy-3,4- or -3,5-dimethylbenzene, 1-hydroxy-2-, -3- or -4-ethyl-benzene, 1-hydroxy-2-, -3- or -4-methoxybenzene, 1-hydroxy-2-, -3- or -4-ethoxybenzene, 1-hydroxy-2-, -3-or -4-chlorobenzene, 3- or 4-hydroxyphenylmethanesulfonic acid, 3- or 4-hydroxybenzenesulfonic acid, 5-hydroxybenzene-1,3-disulfonic acid, 2-hydroxybenzene-1,4-disulfonic acid, 4-hydroxybenzene-1,2-disulfonic acid, 4-hydroxy-5-methylbenzene-1,2-disulfonic acid, 3- or 4-hydroxybenzoic acid, 5-hydroxybenzene-1,3-dicarboxylic acid, 5-hydroxy-2-ethoxybenzenesulfonic acid; and 2-, 4-, 5-, 6-, 7- or 8-hydroxynaphthalene-1-sulfonic acid, 1-, 4-, 5-, 6-, 7- or 8-hydroxynaphthalene-2-sulfonic acid, 4-, 5-, 6-, 7- or 8-hydroxynaphthalene-1,3-disulfonic acid, 2-, 3- or 4-hydroxynaphthalene-1,5-disulfonic acid, 4- or 8-hydroxynaphthalene-1,6-disulfonic acid, 4-hydroxynaphthalene-1,7-disulfonic acid, 3- or 4-hydroxynaphthalene-2,6-disulfonic acid, 3- or 4-hydroxynaphthalene-2,7-disulfonic acid, 6- or 7-hydroxynaphthalene-1,3,5-trisulfonic acid, 4-, 7- or 8-hydroxynaphthalene-1,3,6-trisulfonic acid, 4-hydroxynaphthalene-1,3,7-trisulfonic acid, and e) Aliphatic alcohols such as methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethanesulfonic acid, 3-hydroxy-1-propanesulfonic acid, 2-cyanoethanol, 2-sulfateethanol, glycolic acid, 3-hydroxypropionic acid, benzyl alcohol, 2-, 3- or 4-chlorobenzyl alcohol, 4-methylbenzyl alcohol, 2-, 3- or 4-sulfobenzyl alcohol, 2-phenyl ethanol and 1-phenyl-2-propanol.

When X and/or Y is the group represented by the general formula (Y4), i.e. —$SR^{11}$, compounds for use in the formation of the group —$SR^{11}$, i.e. ($HSR^{11}$) include, for example, phenols, naphthols and aliphatic alcohols, as given by the compounds for use in the formation of the group (Y3) mentioned before, each of whose hydroxyl groups however is replaced with a mercapto group.

In the present bisazo compound (I), X is preferably a halogen atom, a pyridinio group which may be substituted or the group represented by the general formula (Y1) or (Y3). Above all, preferable examples of X are fluoro, chloro, 3-carboxypydinio and the group represented by the general formula (Y1) or (Y3).

When X is the group represented by the general formula (Y1), it is preferable that one of $R^9$ and $R^{10}$ is a hydrogen atom, methyl or ethyl, while the other is a phenyl group which may be substituted, particularly a phenyl group which may be substituted by a substituent selected from the group consisting of an alkyl group having 1 to 4 carbon atoms, an alkoxy group having 1 to 4 carbon atoms, a sulfo group, a carboxy group, a halogen atom, a hydroxy group, a cyano group and an acylamino group.

When X is the group represented by the general formula (Y3), it is preferable that $R^{11}$ is a hydrogen atom, methyl or ethyl. Above all, it is particularly preferable that X is the group represented by the general formula (Y1), one of $R^9$ and $R^{10}$ is a hydrogen atom, methyl or ethyl, while the other is a phenyl group which may be substituted by a substituent selected from the group consisting of an alkyl group having 1 to 4 carbon atoms, an alkoxy group having 1 to 4 carbon atoms, a sulfo group, a carboxy group, a halogen atom, a hydroxy group, a cyano group and an acylamino group.

Preferably, Y is a halogen atom, a pyridinio group which may be substituted, or the group represented by the general formula (Y1). Above all, preferable examples of Y is fluoro, chloro, 3-carboxypyridinio or the group represented by the general formula (Y1).

When Y is the group represented by the general formula (Y1), it is preferable that one of $R^9$ and $R^{10}$ is a hydrogen atom, methyl or ethyl, while the other is a phenyl group which may be substituted, particularly a phenyl group which may be substituted by a substituent selected from the group consisting of an alkyl group having 1 to 4 carbon atoms, an alkoxy group having 1 to 4 carbon atoms, a sulfo group, a carboxy group, a halogen atom, a hydroxy group, a cyano group and an acylamino group. Above all, it is particularly preferable that Y is fluoro or chloro.

In the present bisazo compound (I), amino-naphtholsulfonic acids linking to D or B through an azo group include, for example, H acid, K acid, J acid, γ acid, sulfo J acid, N-methyl J acid, etc., among which H acid, K acid and J acid are particularly preferable.

The present bisazo compounds (I) may be in a free acid form or in their salt form or in a form of their mixture, preferably in a form of their alkali metal salts, alkaline earth metal salts and a mixture thereof, particularly preferably in a form of their sodium salts, potassium salts, lithium salts and a mixture thereof.

The present bisazo compounds are not particularly limited so long as they are represented by the general formula (I), but those represented by the following general formula (I') are preferable. Above all, those represented by the following general formulae (I'') and (I''') are particularly preferable.

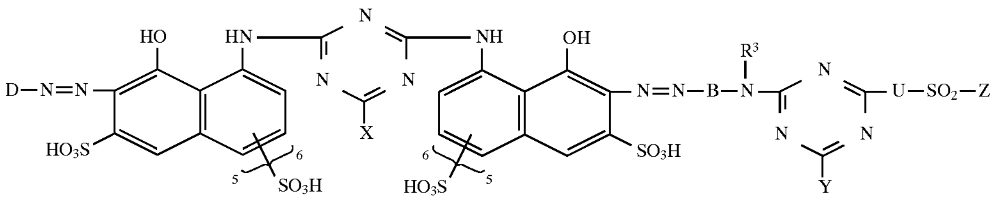

(I')

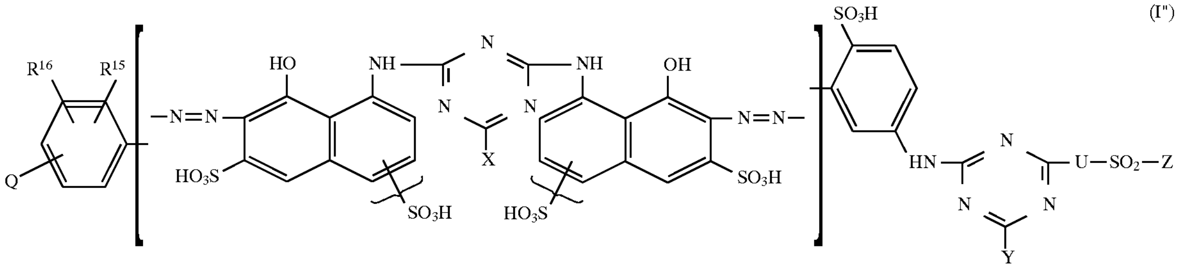

(I")

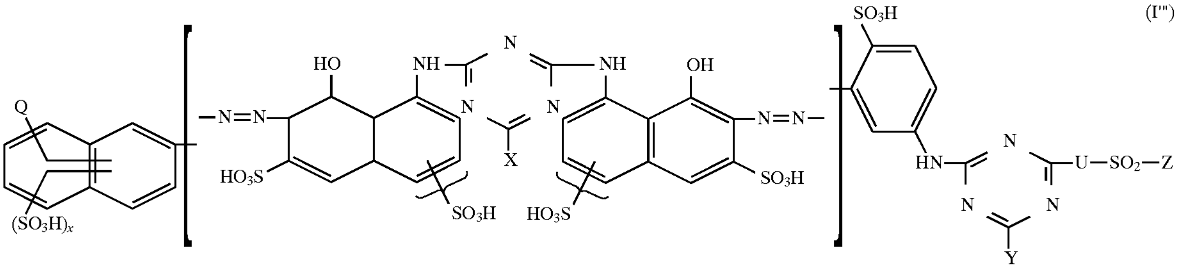

(I''')

where $R^{15}$, $R^{16}$, U, X, Y, Z, Q and X have the same meanings as defined above, and two residues each of the general formula (I") and (I''') given outside the square branckets [ ] show that they may be linked to any two azo groups given within the square branckets.

In the compound represented by the general formula (I") or (I'''), it is particularly preferable to meet the following four requirements 1) to 4):

1) $R^{15}$ and $R^{16}$ each independently are a hydrogen atom, methyl, methoxy or sulfo;

2) U is the group represented by the general formula (U2), and $A^2$ of the general formula (U2) is ethylene or trimethylene and $R^6$ thereof is a hydrogen atom;

3) X is fluoro, chloro, a pyridinio group which may be substituted or a group represented by the general formula (Y1), and $R^9$ of the general formula (Y1) is a hydrogen atom, methyl or ethyl and $R^{10}$ thereof is a phenyl group which may be substituted by a substituent selected from the group consisting of an alkyl group having 1 to 4 carbon atoms, an alkoxy group having 1 to 4 carbon atoms, a sulfo group, a carboxy group, a halogen atom, a hydroxy group, a cyano group and an acylamino group, or X is a group represented by the general formula (Y3), and $R^{11}$ of the general formula (Y3) is a hydrogen atom, methyl or ethyl and Y thereof is fluoro, chloro, a pyridinio group which may be substituted or a group represented by the general formula (Y1), and furthermore $R^9$ is a hydrogen atom, methyl or ethyl and $R^{10}$ is phenyl group which may be substituted by a group selected from the group consisting of an alkyl group having 1 to 4 carbon atoms, an alkoxy group having 1 to 4 carbon atoms, a sulfo group, a carboxy group, a halogen atom, a hydroxy group, a cyano group and an acylamino group; and 4) Q is $-SO_2CH_2CH_2OSO_3H$.

A process for producing the present bisazo compound (I) is not particularly limited, and the following processes are available.

When both X and Y are a halogen atom in the present bisazo compound (I), the following four processes are available:

A first process is based on condensation reaction of a bisazo intermediate compound in a free acid form represented by the following general formula (IV):

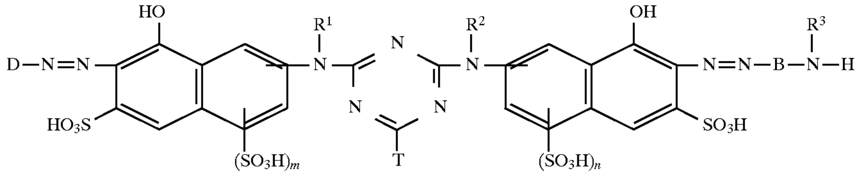

(IV)

where m, n, $R^1$, $R^2$, $R^3$, D and B have the same meanings as defined above and T represents a halogen atom, and an amine compound represented by the following general formula (V):

$$H—U—SO_2—Z \quad (V)$$

where U and Z have the same meanings as defined above, with 2,4,6-trihalogeno-s-triazine in any desired sequence.

The halogeno group represented by T in the general formula (IV) can be the same halogen atoms as given by X and Y before.

In the first process, the compound represented by the general formula (IV) as the starting material can be obtained in the following manner:

A compound represented by the following general formula (VI);

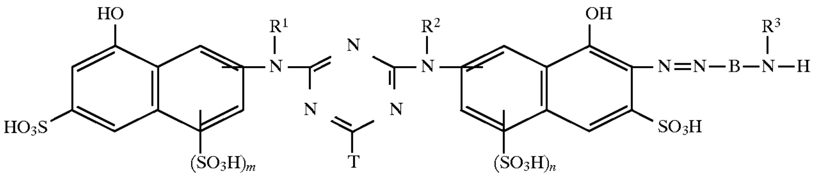
(VI)

, where m, n, $R^1$, $R^2$, $R^3$, B and T have the same meanings as defined above is subjected to the conventional coupling reaction with a diazo compound obtained by the conventional diazotization of a compound represented by the following general formula (VII):

$$D\text{—}NH_2 \qquad \text{(VII)}$$

, where D has the same meanings as defined above, whereby the compound represented by the general formula (IV) can be obtained.

In the first process, the compound represented by the general formula (IV) as the starting material can be also obtained in the following manner:

A compound represented by the following general formula (VIII):

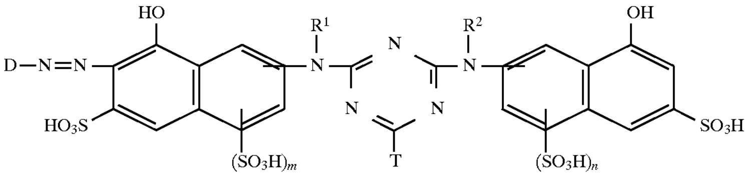
(VIII)

, where m, n, $R^1$, $R^2$, D and T have the same meanings as defined above, is subjected to the conventional coupling reaction with a diazo compound obtained by the conventional diazotiazation of a compound represented by the following general formula (IX):

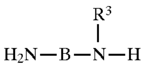
(IX)

, where B and $R^3$ have the same meanings as defined above, whereby the compound represented by the general formula (IV) can be obtained.

A second process is based on condensation reaction of a compound in a free acid form, represented by the following general formula:

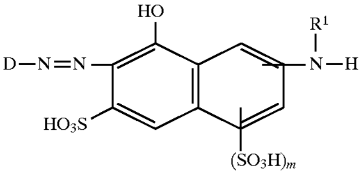
(X)

, where m, $R^1$ and D have the same meanings as defined above, and a compound represented by the following general formula (XI):

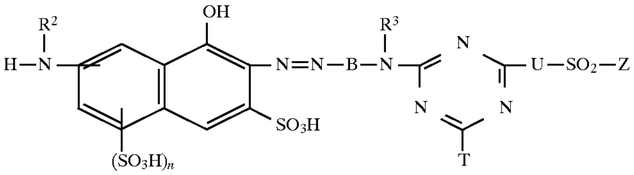
(XI)

, where n, $R^2$, $R^3$, B, U, Z and T have the same meanings as defined above, with 2,4,6-trihalogeno-s-triazine in any desired sequence.

In the general formula (XI), the halogeno group represented by T can be the same halogen atom as given by X and Y before.

In the second process, the compound represented by the general formula (X) as the starting material can be obtained by subjecting a compound in a free acid form represented by the general formula (XII):

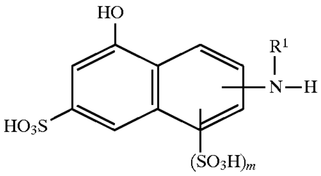

(XII)

, where m and $R^1$ have the same meanings as defined above, to the conventional coupling reaction with a diazo compound obtained by the conventional diazotization of a compound represented by the following general formula (VII).

In the second process, the compound represented by the general formula (XI) as the starting material can be obtained in the following manner:

A compound in an acid form represented by the following general formula (XIII):

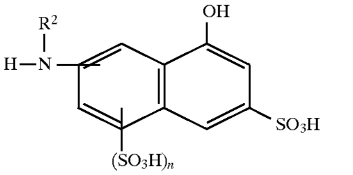

(XIII)

, where n and $R^2$ have the same meanings as defined above, is subjected to the conventional coupling reaction with a diazo compound obtained by the conventional diazotization of a compound represented by the following general formula (XIV):

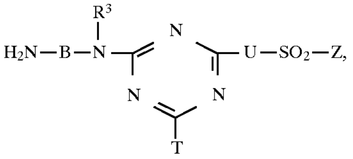

(XIV)

, where $R^3$, B, U, Z and T have the same meanings as defined above, whereby the compound represented by the general formula (XI) can be obtained.

A third process is based on the conventional coupling reaction of a compound represented by the general formula (VIII) with a diazo compound obtained by the conventional diazotization of a compound represented by the general formula (XIV):

A fourth process is based on the conventional coupling reaction of a compound represented by the following general formula (XV):

A first process is based on condensation of a bisazo intermediate compound represented by the general formula (IV), an amine compound represented by the general formula (V), and a compound represented by the following general formula (XVI-1), (XVI-2), (XVI-3), (XVI-4) or (XVII):

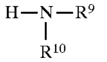

(XVI-1)

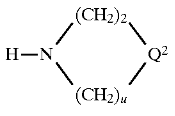

(XVI-2)

$H-O-R^{11}$ (XVI-3)

$H-S-R^{12}$ (XVI-4)

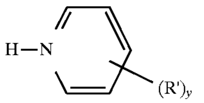

(XVII)

, where $R^9$, $R^{10}$, $R^{11}$, $R^{12}$, $Q^2$ and u have the same meanings as defined above; R' represents a hydrogen atom, a carboxy group, a carbamoyl group, a sulfo group, a halogen atom or an alkyl group having 1 to 4 carbon 5 atoms, which may be substituted; and y represents 1 or 2, with 2,4,6-trihalogeno-s-triazine in any desired sequence.

A second process is based on the conventional coupling reaction of a compound represented by the general formula (VIII) with a diazo compound obtained by the conventional diazotization of a compound represented by the following general formula (XVIII).

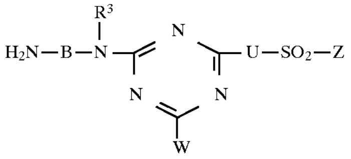

(XVIII)

, where $R^3$, B, U and Z have the same meanings as defined above; and W represents a pyridinio group which may be substituted or a group represented by the general formula (Y1), (Y2), (Y3) or (Y4).

In the second process, the compound represented by the general formula (XVIII) as the starting material can be obtained by condensation reaction of a compound represented by the general formula (V), a compound represented by the general formula (IX), and a compound represented by

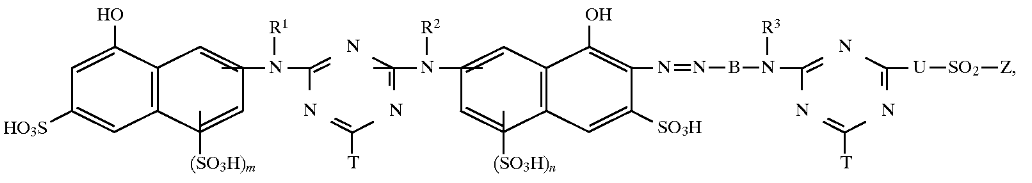

(XV)

, where m, n, $R^1$, $R^2$, $R^3$, B, U, Z and T have the same meanings as defined above, with a diazo compound obtained by the conventional diazotization of a compound represented by the general formula (VII).

The present bisazocompound (I) whose X is a halogeno group and whose Y is a pyridinio group which may be substituted or a group represented by the general formula (Y1), (Y2), (Y3) or (Y4) can be produced according to one of the following two processes:

the general formula (XVI-1), (XVI-2), (XVI-3), (XVI-4) or (XVII) with 2,4,6-trihalogeno-s-triazine in any desired sequence.

Furthermore, the present bisazo compound (I) whose X is a pyridinio group which may be substituted, or a group represented by the general formula (Y1), (Y2), (Y3) or (Y4) and whose Y is a halogeno group, can be produced according to one of the following two processes:

A first process is based on condensation reaction of a compound represented by the general formula (X), an amine compound represented by the general formula (XI) and a compound represented by the general formula (XVI-1), (XVI-2), (XVI-3), (XVI-4) or (XVII) with 2,4,6-trihalogeno-s-triazine in any desired sequence.

A second process is based on the conventional coupling reaction of a compound represented by the following general formula (XIX):

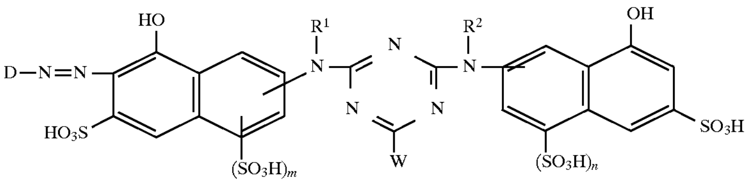

(XIX)

, where m, n, $R^1$, $R^2$ and D have the same meanings as defined above; and W represents a pyridinio group which may be subtituted or a group represented by the general formula (Y1), (Y2), (Y3) or (Y4), with a compound represented by the general formula (XIV) obtained by the conventional diazotization.

Furthermore, the present bisazo compound (I), whose both X and Y independently represent a pyridinio group which may be substituted and a group represented by the general formula (Y1), (Y2), (Y3) or (Y4) can be produced according to one of the following three processes:

A first process is based on the conventional coupling reaction of a compound represented by the general formula (XIX) with a diazo compound obtained by the conventional diazotization of a compound represented by the general formula (XVIII).

A second process is based on condensation of the present bisazo compound (I) whose X is a halogen atom and whose Y is a pyridinio group which may be substituted or a group represented by the general formula (Y1), (Y2), (Y3) or (Y4), or the present bisazo compound whose X is a pyridino group which may be substituted or a group represented by the general formula (Y1), (Y2), (Y3) or (Y4) and whose Y is a halogen atom, with a compound represented by the general formula (XVI-1), (XVI-2), (XVI-3), (XVI-4), or (XVII).

Particularly when X and Y represent the same group, a third process is based on condensation reaction of the present bisazo compound (I) whose both X and Y are a halogen atom, with a compound represented by the general formula (XXI-1), (XVI-2), (XVI-3), (XVI-4) or (XVII), where it is preferable to use at least 2 equivalent weights of a compound represented by the general formula (XVI-1), (XVI-2), (XVI-3), (XVI-4) or (XVII) per one equivalent weight of the present bisazo compound (I) whose both X and Y are a halogen atom.

Concrete examples of 2,4,6-trihalogeno-s-triazine for use in the production of the present bisazo compound (I) and its starting materials include, for example, cyanuric chloride, cyanuric fluoride, etc.

In the condensation reaction with 2,4,6-trihalogeno-s-triazine, the sequence of condensation reactions is not particularly limited, as mentioned before. Furthermore, conditions for the condensation reactions are also not particularly limited. For example, the initial condensation reaction can be carried out at a temperature of −10° C. to 40° C. and a pH of 1 to 10; the second condensation reaction at a temperature of 0° C. to 70° C. and a pH of 2 to 10, and the third condensation reaction at a temperature of 10° C. to 100° C. and a pH of 2 to 9.

In the production of the present bisazo compound (I), when Z of the general formula (V) is $—CH_2CH_2Z^1$ and when the group $Z^1$ removable by an action of an alkali is, for example, an ester such as a sulfate ester or a phosphate ester, formation of the ester group may be carried out after the condensation reaction. That is, the present bisazo compound (I) can be produced by synthesizing the precursor of the present invention according to the same process as above, using an amine compound represented by the following general formula (V-a) in place of the compound represented by the general formula (V), used in the production of the present bisazo compound (I):

$$H—U—SO_2—CH_2CH_2—OH \qquad (V\text{-}a)$$

, where U has the same meaning as defined above, and then by esterifying the resulting compound in the conventional manner, i.e. by conducting formation of the ester group after the condensation reaction.

The present bisazo compound (I) can be used as a dye for dyeing or printing fibrous materials. The fibrous materials are not particularly limited, so long as they contain hydroxyl and/or carboxylic acid amido group, and include, for example, natural or regenerated cellulose fibrous materials, natural or synthetic polyamide fibrous materials, polyurethane fibrous materials, leather materials, mixed spun materials containing these materials, etc. Natural cellulose fibrous materials specifically include, for example, cotton, and other vegetable fibers such as linen, hemp, jute and ramie fibers.

Regenerated cellulose fibrous materials specifically include, for example, rayon, polynosic fibers, cupraammonium rayon fibers and fibers with such trademarks “Tencel”, “Tuffcel”, “Modal”, “Celtima”, etc.

Natural or synthetic polyamide fibrous materials specifically include, for example, wool, other animal fur, silk, polyamide-6,6, polyamide-6, polyamide-11, polyamide-4, etc.

Mixed spun materials containing these materials include, besides mixed spun materials of these fibrous materials, mixed spun materials of these fibrous materials with synthetic fibers such as polyester, nylon, acrylic fibers, etc.

The present bisazo compound can be used for dyeing or printing on the above-mentioned materials, particularly the above-mentioned fibrous materials by a method corresponding to their physico-chemical properties.

Specifically, the present bisazo compound can be used for dyeing or printing on the fibrous materials by exhaustion dyeing, cold batch-up, continuous dyeing, printing, etc.

For example, the exhaustion dyeing of cellulose fibrous materials can be carried out at a relatively low temperature in the presence of an acid binding agent such as sodium carbonate, sodium tertiary phosphate, sodium bicarbonate, and caustic soda, if required, while adding thereto a neutral salt such as Glauber's salt, table salt, etc. and, if further required, while adding thereto a dissolution auxiliary, a penetrant, a levelling agent, etc. Addition of the acid binder, neutral salt, etc. may be carried out all at once or in portions according to the conventional procedure.

Dyeing on the cellulose fibers by cold batch-up can be carried out by padding with a neutral salt such as Glauber's salt, table salt, etc., and an acid binder such as caustic soda, sodium silicate, etc. and then leaving the fibers in a sealed package at a given temperature.

Dyeing cellulose fibers by continuous dyeing can be carried out by a one-phase padding method comprising padding at room temperature or at an elevated temperature in the presence of an acid binding agent such as sodium carbonate, sodium bicarbonate, etc., followed by steaming or hot air drying, or by a two-phase padding method comprising dipping the fibers into a padding bath containing the present bisazo compound as dissolved therein, then padding with a neutral salt such as Glauber's salt, table salt, etc., and an acid binder such as caustic soda, sodium silicate, etc., followed by steaming or hot air drying.

Printing cellulose fibers can be carried out by a one-phase method comprising printing with a printing paste containing a binding agent such as sodium bicarbonate, etc. followed by steaming at a temperature of 80° C. or higher or by a two-phase method comprising, for example, with a neutral or weakly acidic printing paste, passing through an alkaline bath containing an electrolyte or overpadding with an alkaline, electrolyte-containing padding bath, followed by steaming or hot air drying. The printing paste may contain a thickening agent such as sodium alginate, starch ether, et., and/or an emulsifier, and, if required, a printing auxiliary such as urea, etc. and/or a dispersing agent.

When the present bisazo compound used for dyeing or printing on cellulose fibers, an acid binding agent is not particularly limited, and includes, for example, alkali metal hydroxides, water-soluble basic salts of alkali metal or alkaline earth metals with an inorganic or organic acid, particularly alkali metal hydroxides and weak or medium strength alkali metal salts of inorganic or organic acid, among which sodium or potassium hydroxide and sodium salts and potassium salts are preferable. Specific examples of the acid binding agent include, besides the above-mentioned sodium carbonate, sodium tertiary phosphate, sodium bicarbonate, caustic soda, sodium carbonate and sodium silicate, caustic potassium, sodium formate, potassium carbonate, sodium primary or secondary phosphate, sodium trichloroacetate, etc.

In case of exhaustion dyeing of synthetic or natural polyamide fibers or of polyurethane fibers, the present bisazo compound is subjected to exhaustion dyeing in an acidic or weakly acidic dyeing bath at a controlled pH, followed by changing the pH to a neutral to alkaline side at a temperature of about 60° to about 120° C. If required, it is not objectionable to add to the bath a levelling agent such as a condensation product of cyanuric chloride with a 3-fold molar amount of aminobenzenesulfonic acid or aminonaphthalenesulfonic acid or a levelling agent such as an addition product of stearylamine with ethylene oxide, etc.

The present bisazo compound, when used for dyeing or printing particularly cellulose fibrous materials, has a distinguished reproducibility, better levelling and wash-off properties, a higher build-up property, and a higher effective dyeing ratio, and also has a further advantage of dyeability at a low salt concentration.

By use of the present bisazo compound, dyed products and printed products with various color fastnesses, particularly color fastnesses to chlorine, light, sweat, sweat and sun light, acid hydrolysis, alkali, washing and peroxide washing can be obtained.

The present diazo compound can be mixed, if required, with other dyes to such an extent as not to deteriorate the characteristics of the present invention to obtain a desired color. Dyes for the mixing are not particularly limited, so long as they are reactive dyes. They are, for example, dyes having at least one reactive group such as sulfate ethylsulfonate group, vinylsulfone group, monochlorotriazine group, monofluorotriazine group, a mononicotinic acid triazine group, dichloro-triazine group, difluoromonochloropyrimidine group and trichloropyrimidine group; dyes with trademarks of Sumifix, Sumifix, Supra, Remazol, Levafix, Procion, Cibacron, Basilen, Drimarene, Kayacion, Kayacelon, React, etc.; further dyes disclosed in JP-A 50(1975)-178, 51(1976)-17538, 56(1981)-9483, 56(1981)-15481, 56(1981)-118976, 56(1981)-128380, 57(1982)-2365, 57(1982)-89679, 57(1982)-143360, 58(1983)-191755, 59(1984)-15451, 59(1984)-96174, 59(1984)-161463, 60(1985)-6754, 60(1985)-123559, 60(1985)-229957, 60(1985)-260654, 61(1986)-126175, 61(1986)-155469, 61(1986)-225256, 63(1988)-77974, 63(1988)-225664, 1(1989)-185370, 3(1991)-770, 5(1993)-247366 and 6(1994)-287463; and dyes represented by C.I. Reactive Blue 19, C.I. Reactive Black 5, etc.

The present bisazo compound is a useful reactive dye with distinguished dyeability, for example, distinguished build-up and levelling properties, and the present method can produce red-dyed or printed products having distinguished fastnesses with a good reproducibility.

PREFERRED EMBODIMENTS OF THE INVENTION

The present invention will be described in detail below, referring to Example, which will not limit the present invention, where parts are by weight.

EXAMPLE 1

42.3 parts of 2-(2-sulfophenyl)azo-1-hydroxy-8-aminonaphthalene-3,6-disulfonic acid were subjected to a condensation reaction with 18.4 parts of cyanuric chloride according to the conventional procedure, then to another condensation reaction with 31.9 parts of 1-amino-8-hydroxynaphthalene-3,6-disulfonic acid, then to a coupling reaction with a diazo comound obtained by diazotization of 58.1 parts of 2-(3-amino-4-sulfo-phenyl)amino-4-[3-(2-sulfatoethylsulfonyl)phenyl]amino-6-chloro-1,3,5-triazine, and then salted out, whereby a bisazo compound in a free acid form represented by the following formula was obtained:

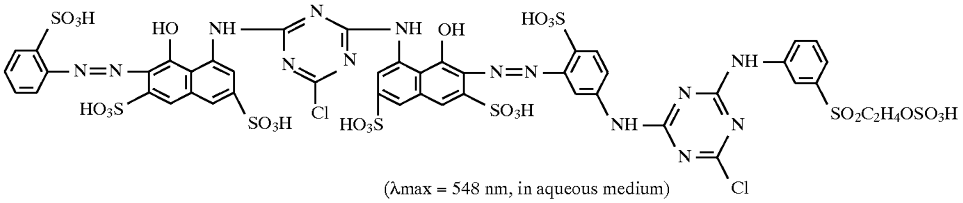

(λmax = 548 nm, in aqueous medium)

EXAMPLE 2

In the following Tables 1 to 13, compounds in Column 2 in place of 2-(2-sulfophenyl)azo-1-hydroxy-8-aminonaphthalene-3,6-disulfonic acid, compounds in Column 3 in place of 1-amino-8-hydroxynaphthalene-3,6-disulfonic acid and compound in Column 4 in place of 2-(3-amino-4-sulfophenyl)amino-4-[3-(2-sulfatoethylsulfonyl)phenyl]amino-6-chloro-1,3,5-triazine were individually used and subjected to synthesis in the same manner as in Example, whereby corresponding bisazo compounds in a free acid form were obtained. Color of dyed cotton products is shown also in Column 5.

In the synthesis, even if the sequence of first condensation reaction and second condensation reaction to cyanuric chloride was changed, the same compounds were obtained.

When synthesis was carried with corresponding hydroxyethylsulfonyl compounds in place of compounds in Column 4, and finally sulfate esterification was carried out according to the conventional procedure, the same results were obtained.

EXAMPLE 3

42.3 parts of 2-(2-sulfophenyl)azo-1-hydroxy-8-aminonaphthalene-3,6-disulfonic acid was subjected to a condensation reaction with 18.4 parts of cyanuric chloride, then to another condensation reaction with 31.9 parts of 1-amino-8-hydroxynaphthalene-3,6 -disulfonic acid, to further condensation reaction with 9.3 parts of aniline according to the conventional procedure, and then to a coupling reaction with a diazo compound obtained by diazotization according to the conventional procedure of 58.1 part of 2-(3-amino-4-sulfophenyl)amino-4-[3-(2-sulfatoethylsulfonyl)phenyl] amino-6-chloro-1,3,5-triazine, and then salted out, whereby a bisazo compound in an acid form represented by the following formula was obtained.

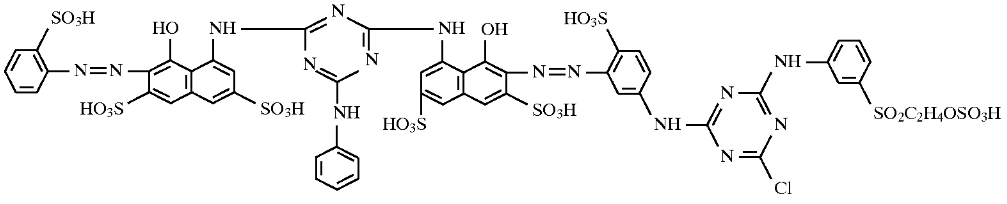

(λmax = 554 nm in aqueous medium)

EXAMPLE 4

In the following Tables 14 to 24, compounds in Column 2 in place of 2-(2-sulfophenyl)azo-1-hydroxy-8-aminonaphthalene-3,6-disulfonic acid, compounds in Column 3 in place of aniline, compounds in Column 4 in place of 1-amino-8-hydroxynaphthalene-3,6-disulfonic acid, and compounds in Column 5 in place of 2-(3-amino-4-sulfophenyl)amino-4-[3-(2-sulfatoethylsulfonyl)-phenyl] amino-6-chloro-1,3,5-triazine were individually used and subjected to synthesis according to the same procedure as in Example 3, whereby corresponding bisazo compounds in a free acid form were obtained. Color of dyed cotton products by these azobis compounds is shown in Column 6.

In the synthesis, even if the sequence of first condensation reaction, second condensation reaction and third condensation reaction to cyanuric chloride was changed as desired, the same compounds were obtained.

When synthesis was carried out with corresponding hydroxyethylsulfonyl compounds in place of compounds in Column 5 and finally sulfate esterification was carried out according to the conventional procedure, the same compounds were obtained.

DYEING EXAMPLE 1

0.3 part of one of bisazo compounds obtained in Examples 1 to 4 was dissolved in 200 parts of water, and then 20 parts of Glanber's salt and further 10 parts of cotton were added thereto, followed by heating to 60° C. 30 minutes after the temperature reached 60°, 4 parts of sodium carbonate was added thereto, and dyeing was carried out at the same temperature for one hour, followed by water washing and soaping. At the water washing and soaping a good wash-off property was obtained and effluent water from the dyeing was less colored. The resulting individual dyed cotton products were uniformly deep red. The individual dyed product had better color fastness to chlorine, light, sweat, sweat and sun light, acid hydrolysis, alkali, washing and peroxide washing.

DYEING EXAMPLE 2

Dyeing was carried out in quite the same manner as in Dyeing Example 1 except that the amount of Glauber's salt was changed from 20 parts to 10 parts. The resulting individual dyed products had the same quality as that obtained in Dyeing Example 1.

DYEING EXAMPLE 3

Dyeing was carried out in quite the same manner as in Dyeing Example 1 except that the amount of Glauber's salt was changed from 20 parts to 4 parts. The resulting individual dyed product had the same quality as that obtained in Dyeing Example 1.

DYEING EXAMPLE 4

Dyeing was carried out in quite the same manner as in each of Dyeing Examples 1 to 3, except that the dyeing temperature was changed from 60° C. to 70° C. The resulting individual dyed products had the same quality as that obtained in Dyeing Examples 1 to 3.

DYEING EXAMPLE 5

Dyeing was carried out in quite the same manner as in each of Dyeing Examples 1 to 3, except that the dyeing temperature was changed to 60° C. to 80° C. The resulting individual dyed products had the same quality as that obtained in Dyeing Examples 1 to 3.

DYEING EXAMPLE 6

Dyeing was carried out in quite the same manner as in each of Dyeing Examples 1 to 5, except that 0.3 part of one of the bisazo compounds and 0.06 part of sodium salt of condensate of methylnaphthalenesulfonic acid with formaldehyde having a sulfonation degree of 110% and an average polymerization degree of 1.8 were used in place of 0.3 part of one of the bisazo compounds. The resulting individual dyed products had the same quality as that obtained in Dyeing Examples 1 to 5.

DYEING EXAMPLE 7

| Color paste composition | |
|---|---|
| Bisazo compound | 5 parts |
| Urea | 5 parts |
| Sodium alginate (5%) stock paste | 50 parts |
| Hot water | 25 parts |
| Sodium bicarbonate | 2 parts |
| Balance (water) | 13 parts |

Color paste having the foregoing composition was printed on mercerized cotton broad cloth, and after an intermediate drying the printed cloth was steamed at 100° C. for 5 minutes, washed with hot water, soaped, washed with hot water and dried for finishing. The resulting printed cloth was uniformly deep red and had better color fastness to chlorine, light, sweat, sweat and such light, acid hydrolysis, alkali, washing and peroxide washing.

TABLE 1
| 1 | 2 | 3 | 4 | 5 |
|---|---|---|---|---|
| 1 | 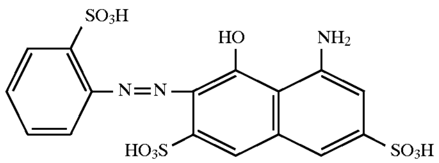 | 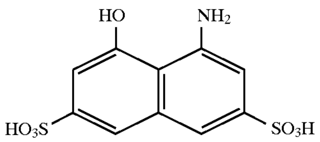 | 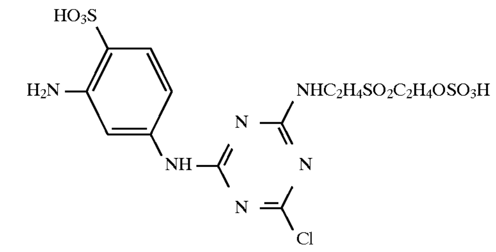 | Red |
| 2 | " | " | 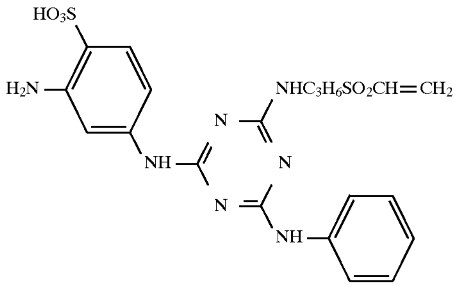 | " |
| 3 | 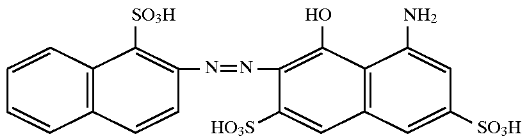 | " | 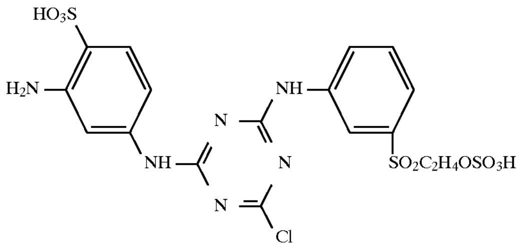 | " |
| 4 | " | 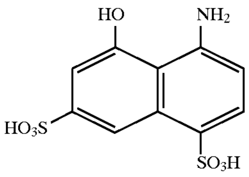 | " | " |

TABLE 1-continued
| 1 | 2 | 3 | 4 | 5 |
|---|---|---|---|---|
| 5 | 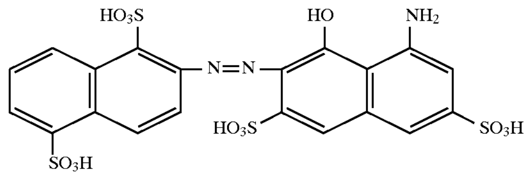 | " | 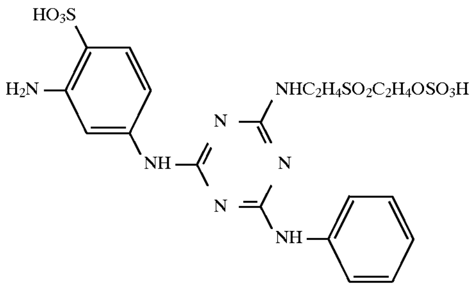 | " |

TABLE 2
| 1 | 2 | 3 | 4 | 5 |
|---|---|---|---|---|
| 6 | 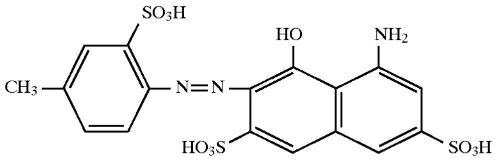 | 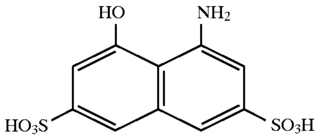 | 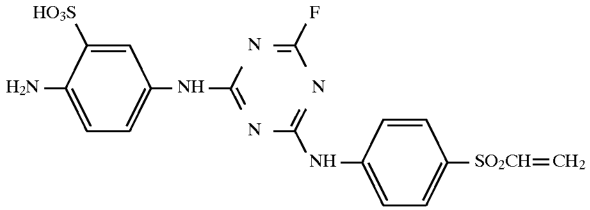 | Red |
| 7 | 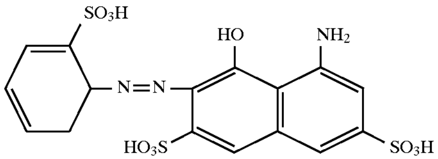 | " | 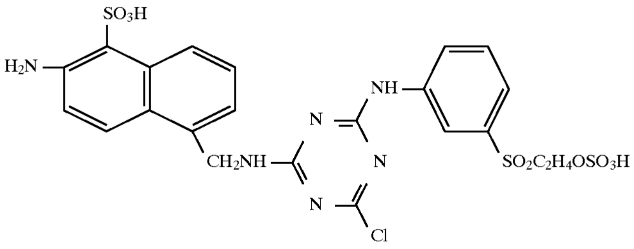 | " |
| 8 | 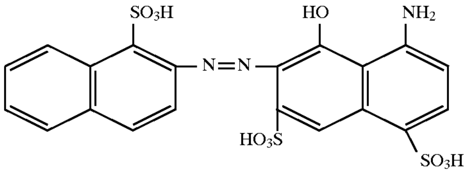 | " | 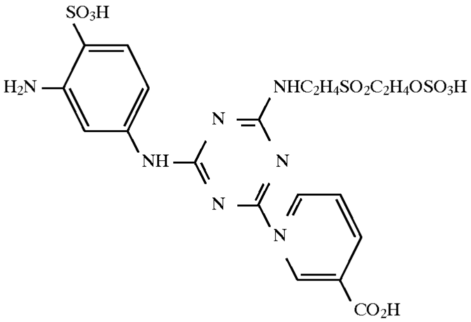 | " |

TABLE 2-continued
| 1 | 2 | 3 | 4 | 5 |
|---|---|---|---|---|
| 9 | 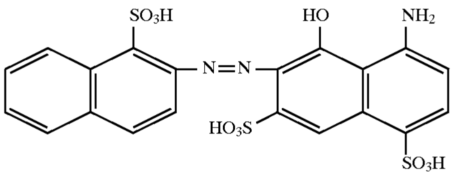 | " | 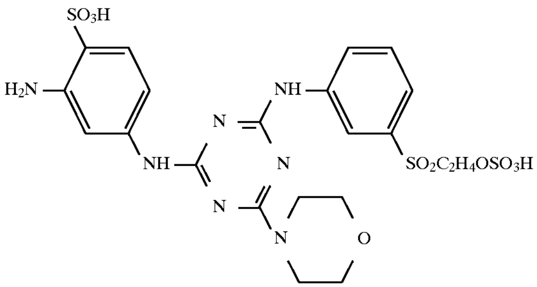 | " |
| 10 | 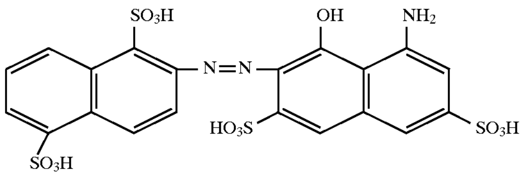 | " | 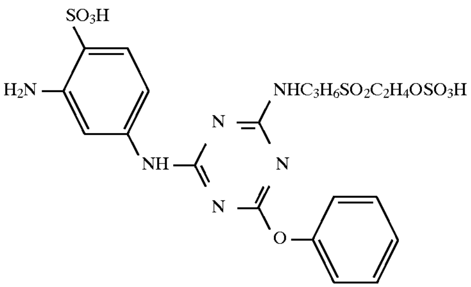 | " |

TABLE 3
| 1 | 2 | 3 | 4 | 5 |
|---|---|---|---|---|
| 11 | 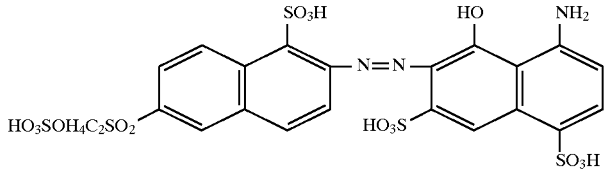 | 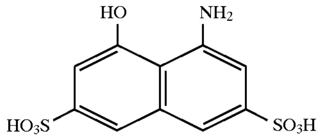 | 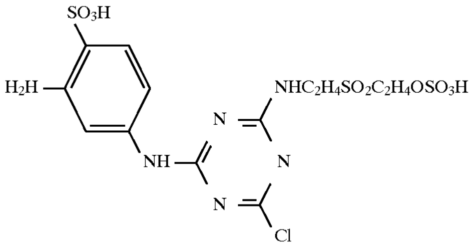 | Red |
| 12 | 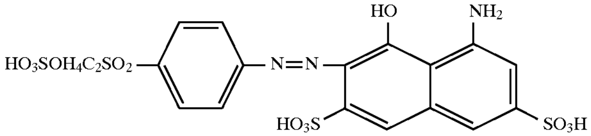 | " | " | " |
| 13 | " | " | 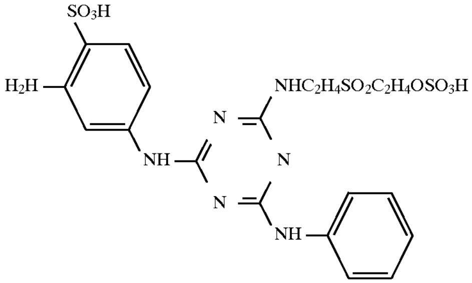 | " |
| 14 | 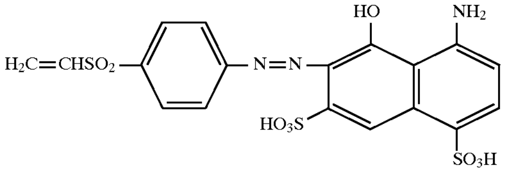 | 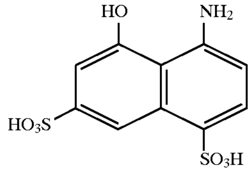 | " | " |

TABLE 3-continued
| 1 | 2 | 3 | 4 | 5 |
|---|---|---|---|---|
| 15 | 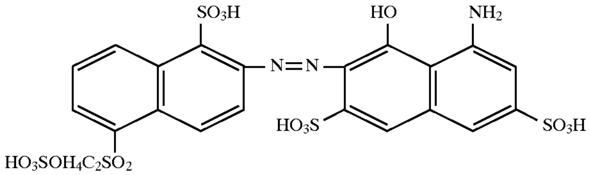 | 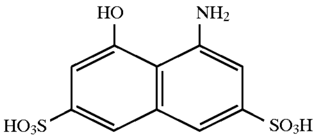 | 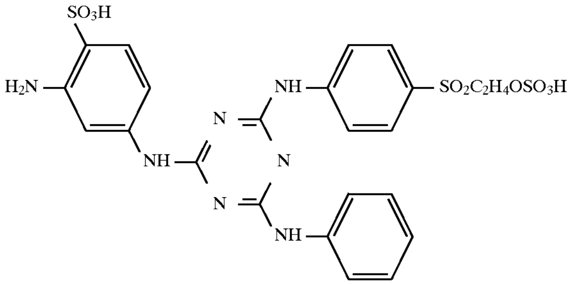 | " |

TABLE 4
| 1 | 2 | 3 | 4 | 5 |
|---|---|---|---|---|
| 16 | 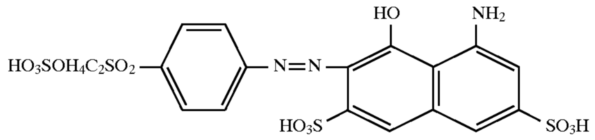 | 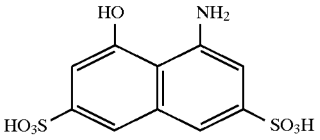 | 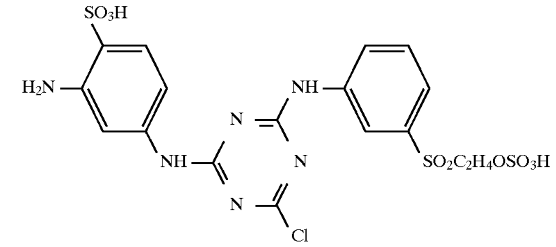 | Red |
| 17 | 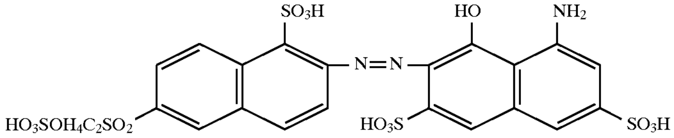 | " | 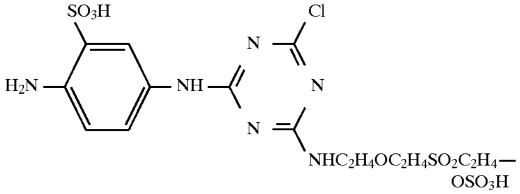 | " |
| 18 | " | " | 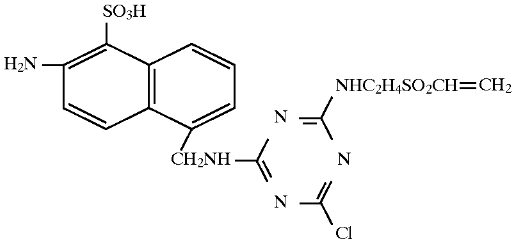 | " |
| 19 | 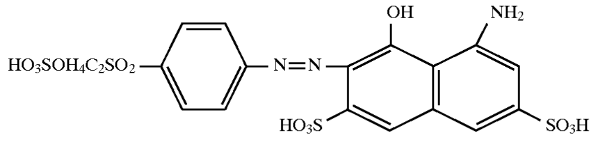 | " | 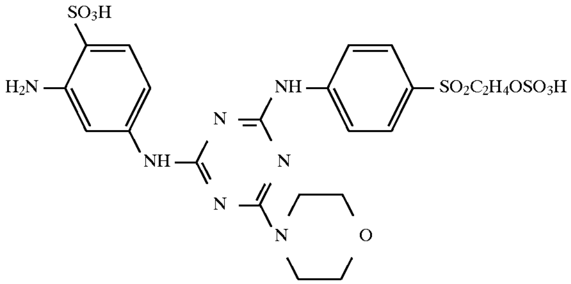 | " |

TABLE 4-continued
| 1 | 2 | 3 | 4 | 5 |
| --- | --- | --- | --- | --- |
| 20 | " | 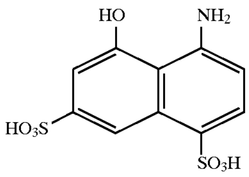 | 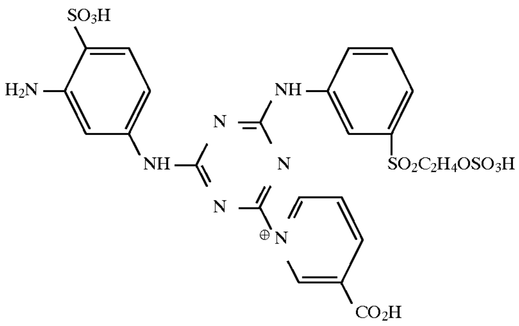 | " |

TABLE 5
| 1 | 2 | 3 | 4 | 5 |
|---|---|---|---|---|
| 21 | 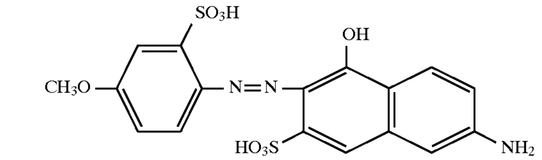 | 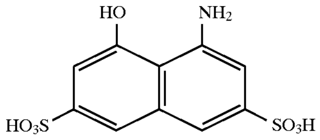 | 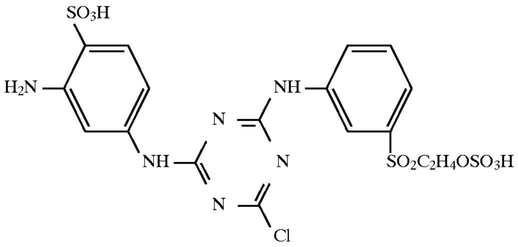 | Red |
| 22 | " | " | 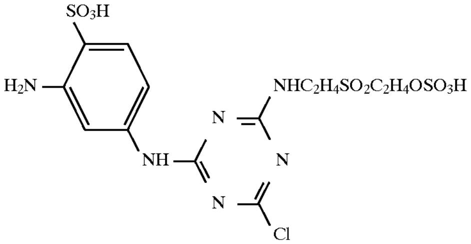 | " |
| 23 | 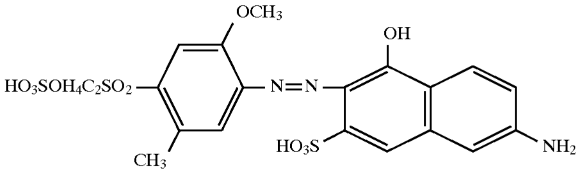 | " | " | " |
| 24 | " | " | 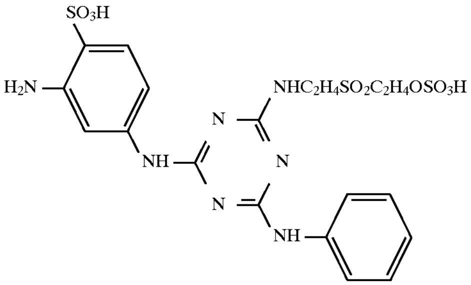 | " |

TABLE 5-continued
| 1 | 2 | 3 | 4 | 5 |
|---|---|---|---|---|
| 25 | 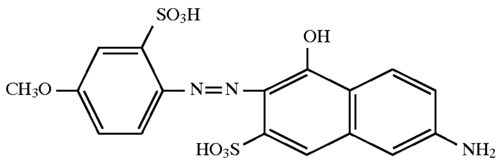 | " | " | " |

TABLE 6
| 1 | 2 | 3 | 4 | 5 |
|---|---|---|---|---|
| 26 | 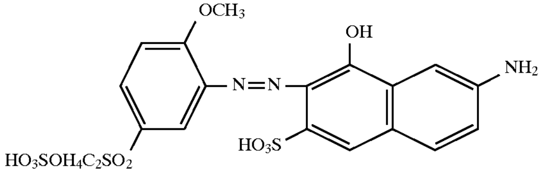 | 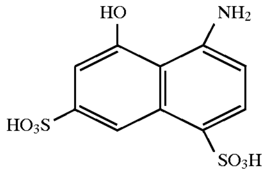 | 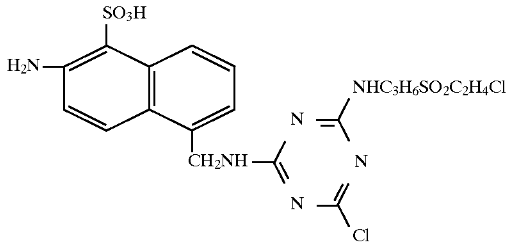 | Red |
| 27 | 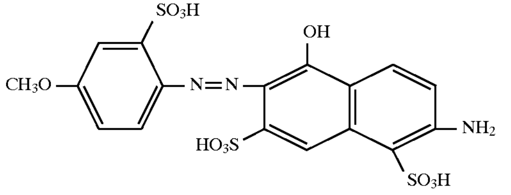 | " | 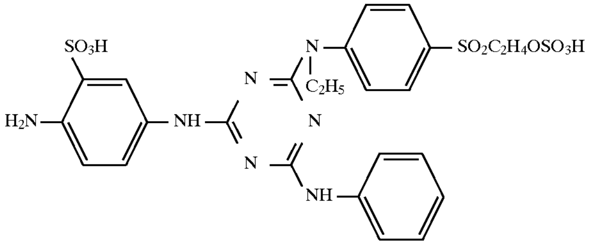 | " |
| 28 | 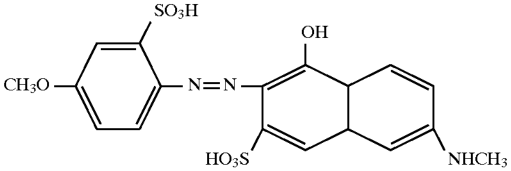 | 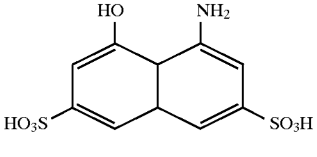 | 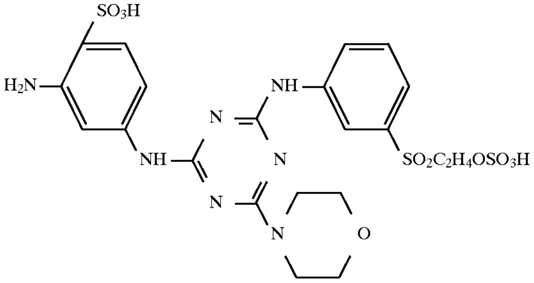 | |

TABLE 6-continued
| 1 | 2 | 3 | 4 | 5 |
|---|---|---|---|---|
| 29 | 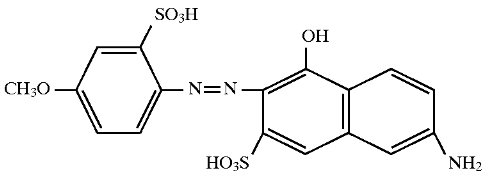 | " | 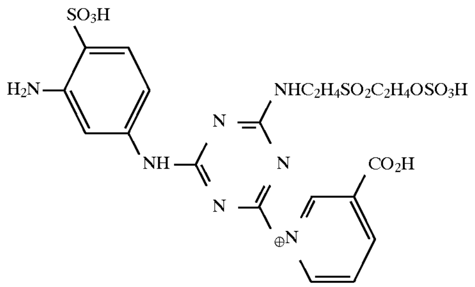 | " |
| 30 | 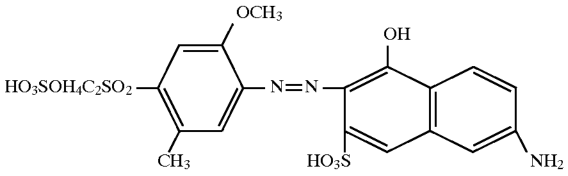 | " | 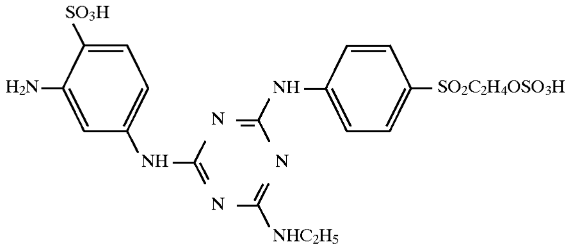 | " |

TABLE 7
| 1 | 2 | 3 | 4 | 5 |
|---|---|---|---|---|
| 31 | 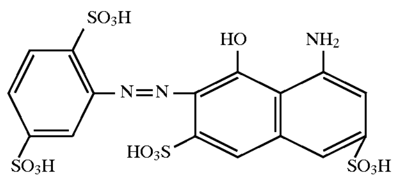 | 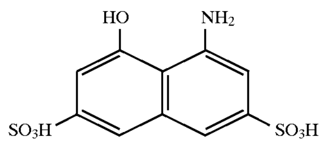 | 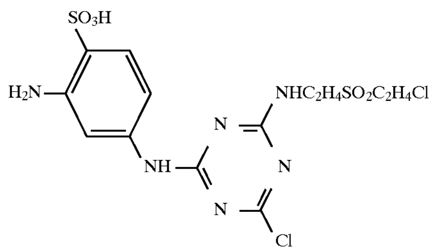 | Red |
| 32 | " | 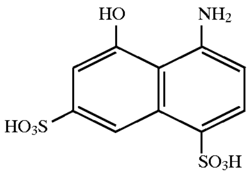 | 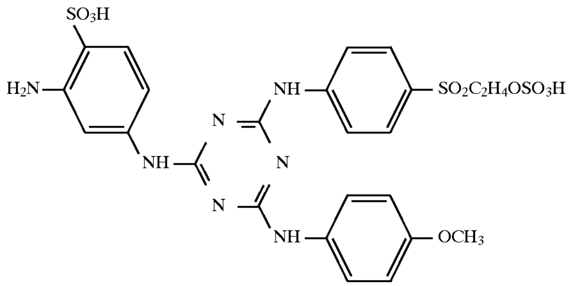 | " |
| 33 | 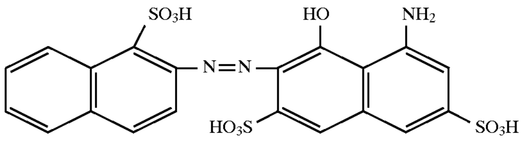 | 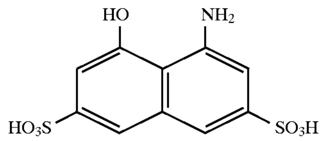 | 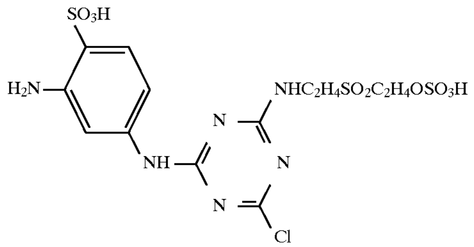 | " |
| 34 | 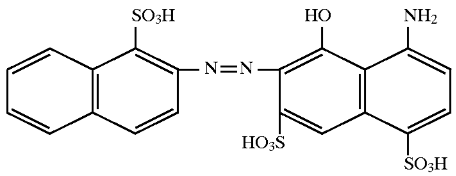 | 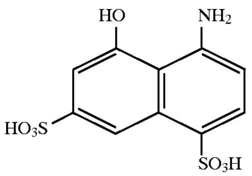 | " | " |

TABLE 7-continued
| 1 | 2 | 3 | 4 | 5 |
|---|---|---|---|---|
| 35 | 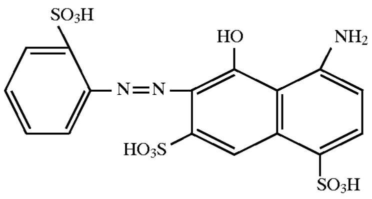 | " | 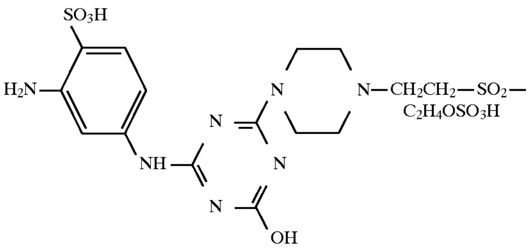 | " |

TABLE 8
| 1 | 2 | 3 | 4 | 5 |
|---|---|---|---|---|
| 36 | 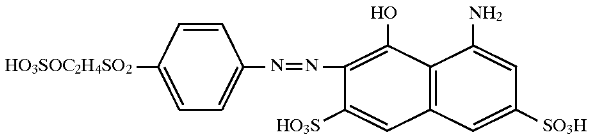 | 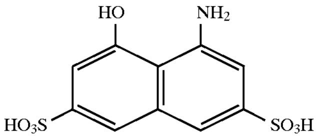 | 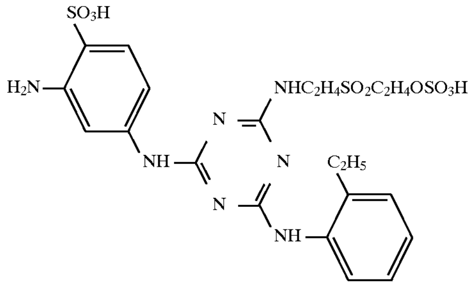 | Red |
| 37 | " | " | 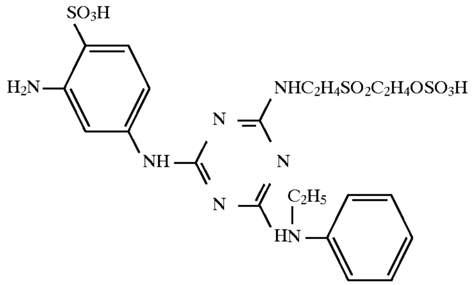 | " |
| 38 | " | " | 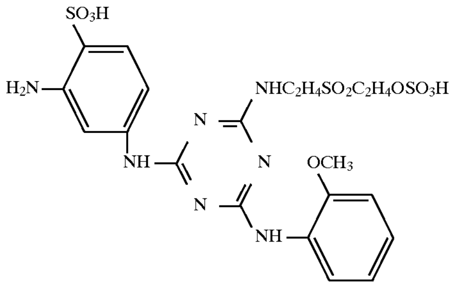 | " |

TABLE 8-continued
| 1 | 2 | 3 | 4 | 5 |
| --- | --- | --- | --- | --- |
| 39 | " | " | 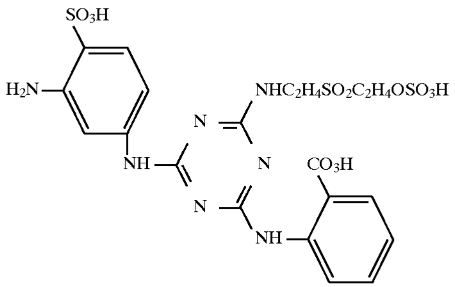 | " |
| 40 | 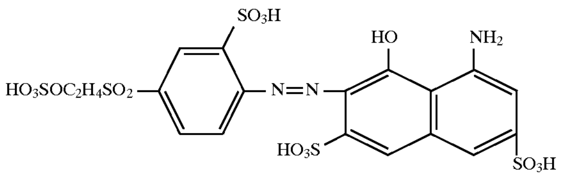 | " | 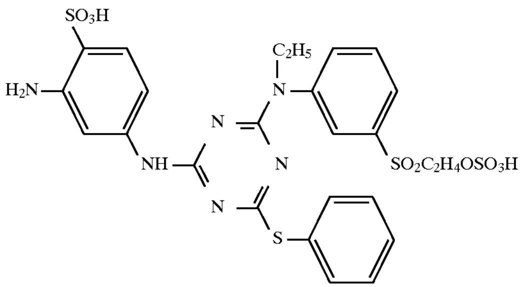 | " |

TABLE 9
| 1 | 2 | 3 | 4 | 5 |
|---|---|---|---|---|
| 41 | 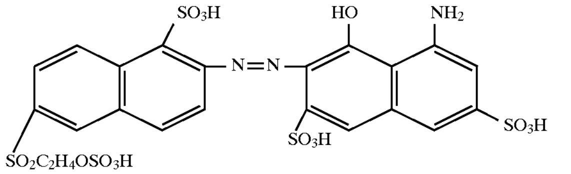 | 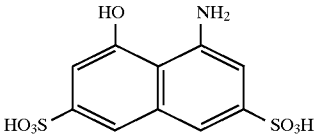 | 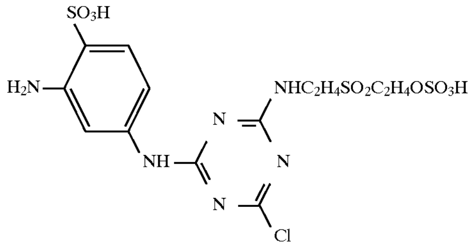 | Red |
| 42 | " | 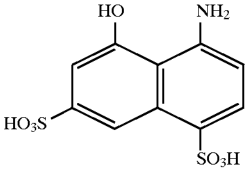 | 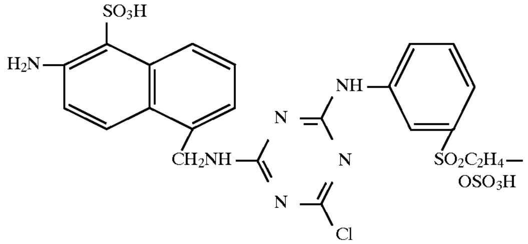 | " |
| 43 | 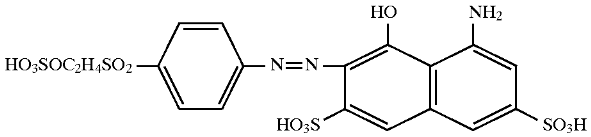 | 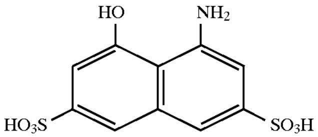 | " | " |
| 44 | 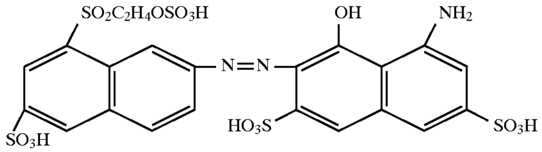 | " | 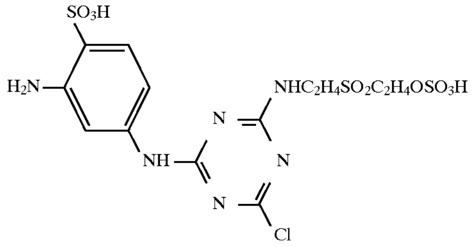 | " |

TABLE 9-continued
| 1 | 2 | 3 | 4 | 5 |
|---|---|---|---|---|
| 45 | 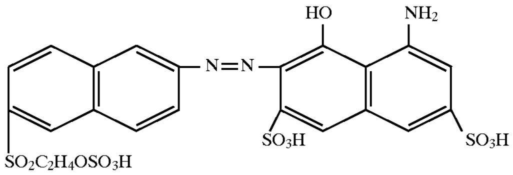 | " | " | " |

TABLE 10
| 1 | 2 | 3 | 4 | 5 |
|---|---|---|---|---|
| 46 | 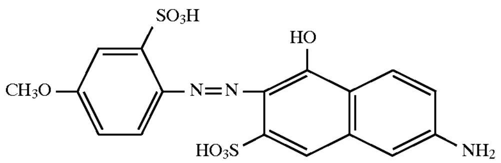 | 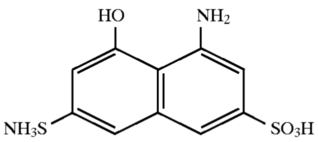 | 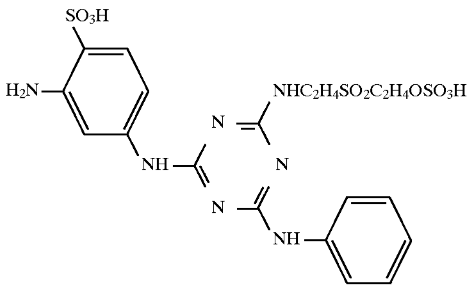 | Red |
| 47 | " | " | 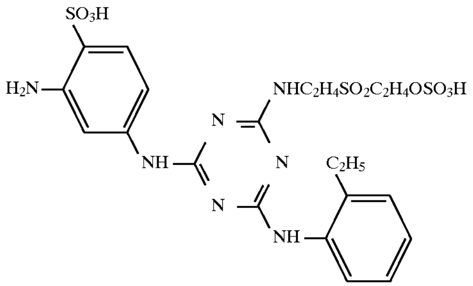 | " |
| 48 | " | " | 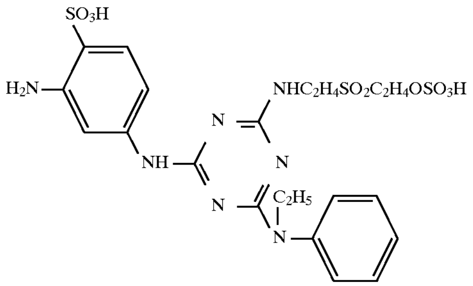 | " |

TABLE 10-continued
| 1 | 2 | 3 | 4 | 5 |
|---|---|---|---|---|
| 49 | " | " | 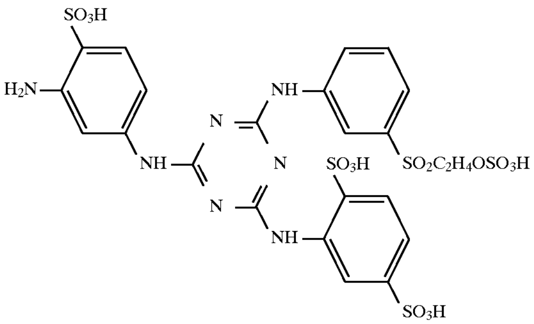 | " |
| 50 | " | " | 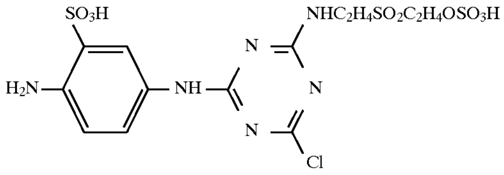 | " |

TABLE 11
| 1 | 2 | 3 | 4 | 5 |
|---|---|---|---|---|
| 51 | 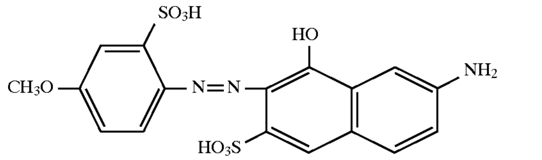 | 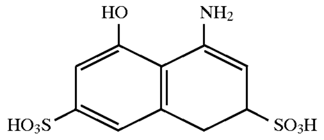 | 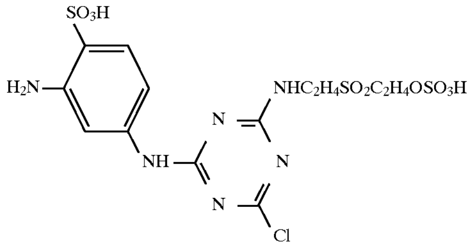 | Red |
| 52 | 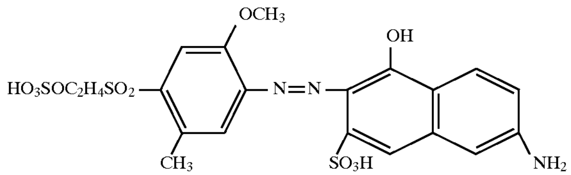 | " | 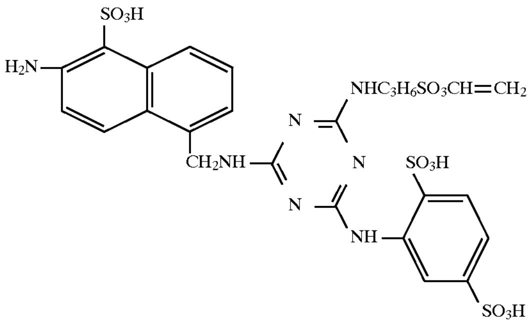 | " |
| 53 | " | " | 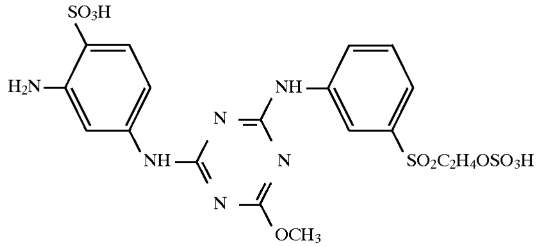 | " |

TABLE 11-continued
| 1 | 2 | 3 | 4 | 5 |
|---|---|---|---|---|
| 54 | " | 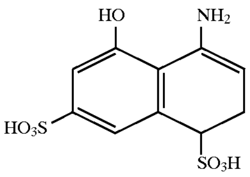 | 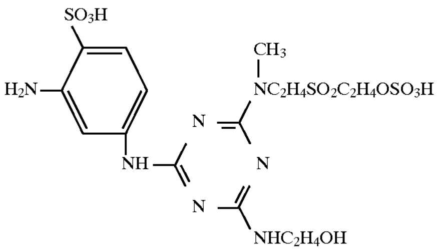 | " |
| 55 | " | " | 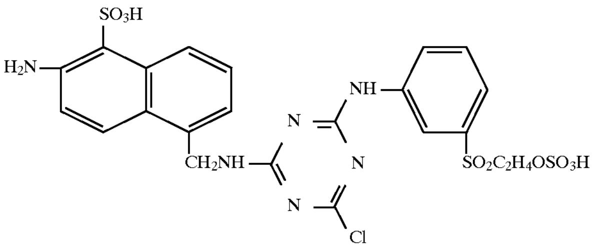 | " |

TABLE 12
| 1 | 2 | 3 | 4 | 5 |
|---|---|---|---|---|
| 56 | 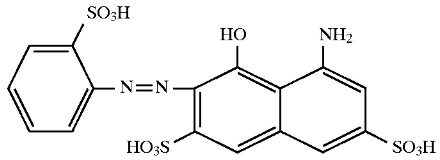 | 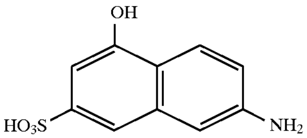 | 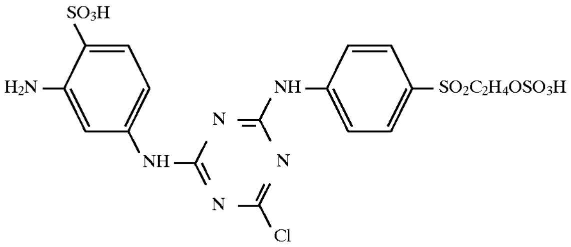 | Red |
| 57 | 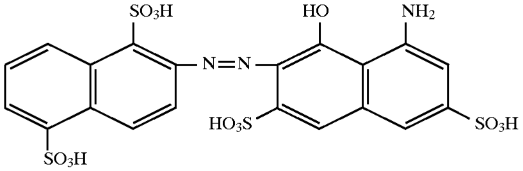 | " | 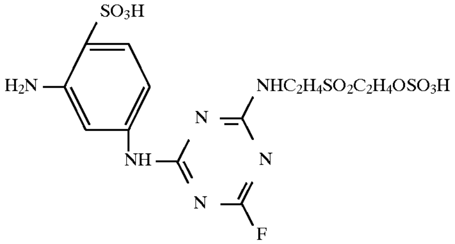 | " |
| 58 | 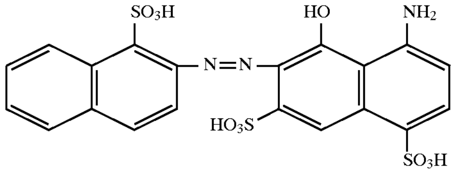 | " | 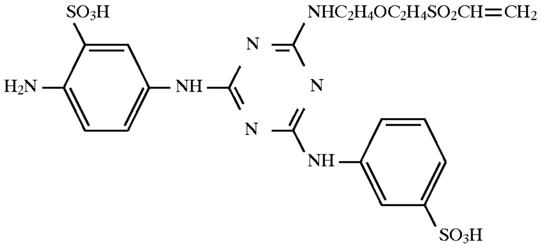 | " |
| 59 | 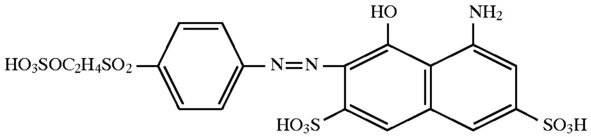 | 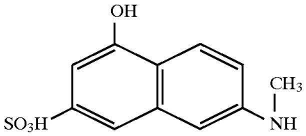 | 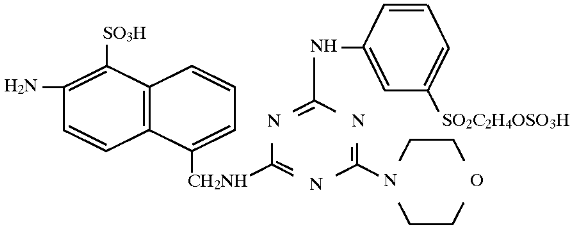 | " |

TABLE 12-continued
| 1 | 2 | 3 | 4 | 5 |
|---|---|---|---|---|
| 60 | " | 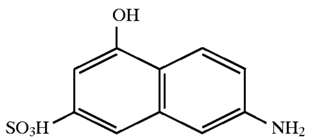 | 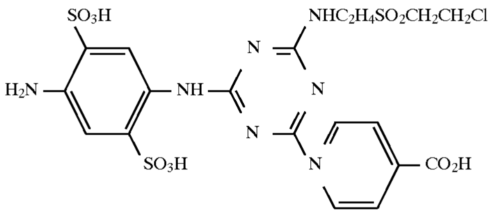 | " |

TABLE 13
| 1 | 2 | 3 | 4 | 5 |
|---|---|---|---|---|
| 61 | 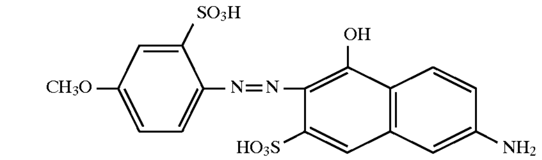 | 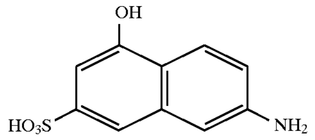 | 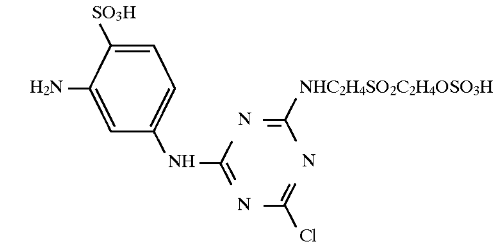 | Scarlet |
| 62 | 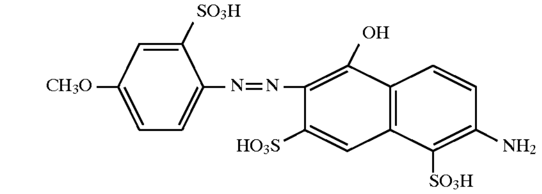 | " | 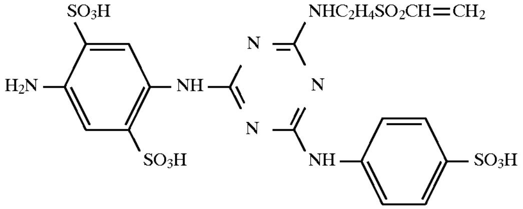 | " |
| 63 | " | 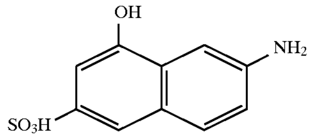 | " | " |
| 64 | 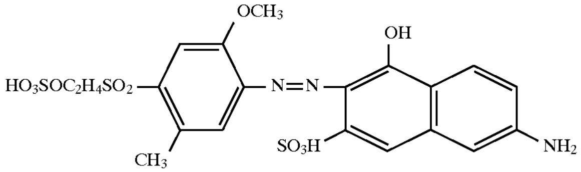 | 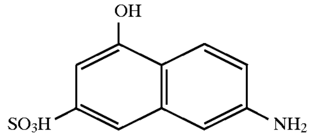 | 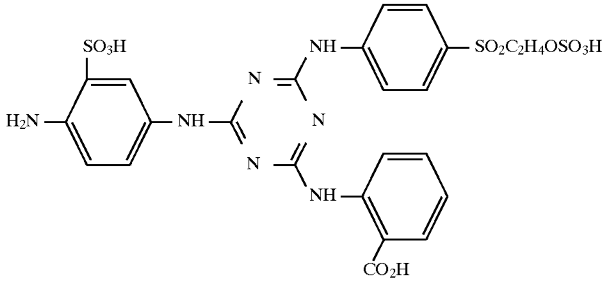 | " |

TABLE 13-continued
| 1 | 2 | 3 | 4 | 5 |
| --- | --- | --- | --- | --- |
| 65 | " | " | 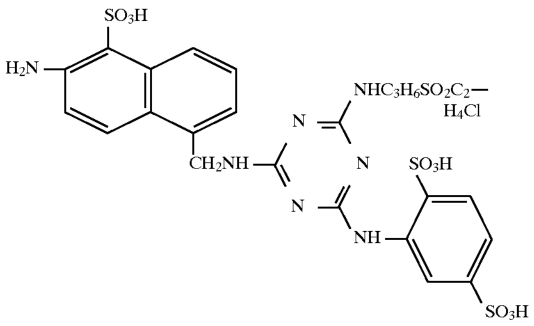 | " |

TABLE 14
| 1 | 2 | 3 | 4 | 5 | 6 |
|---|---|---|---|---|---|
| 1 | 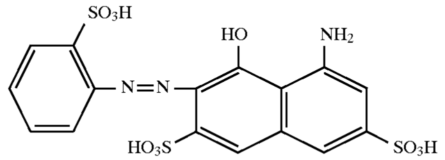 | 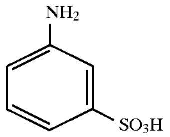 | 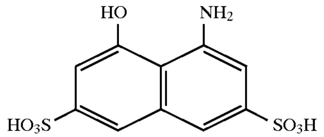 | 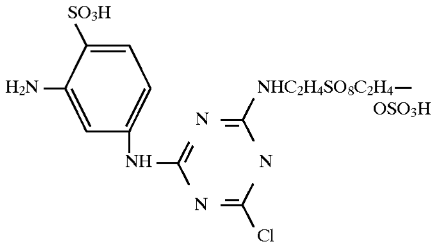 | Red |
| 2 | 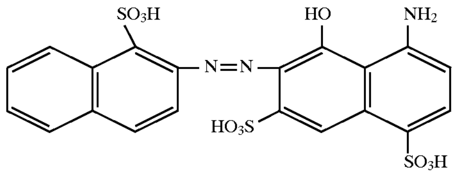 | 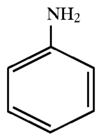 | " | 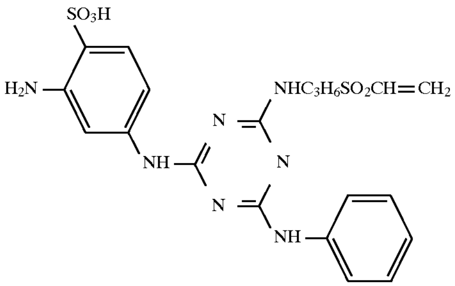 | " |
| 3 | 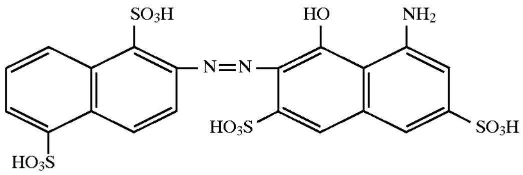 | 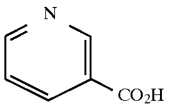 | " | 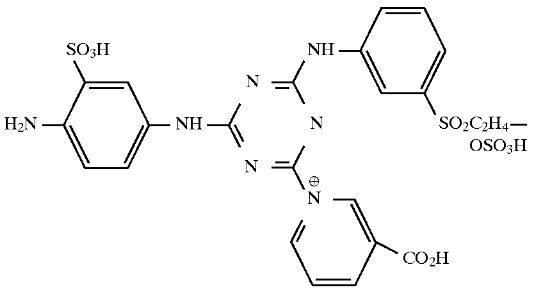 | " |

TABLE 14-continued
| 1 | 2 | 3 | 4 | 5 | 6 |
|---|---|---|---|---|---|
| 4 | 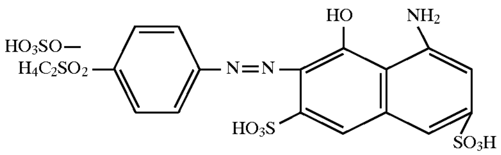 | 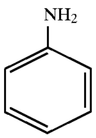 | " | 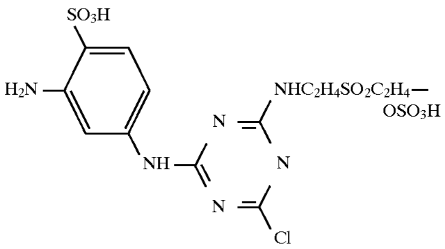 | " |
| 5 | " | " | " | 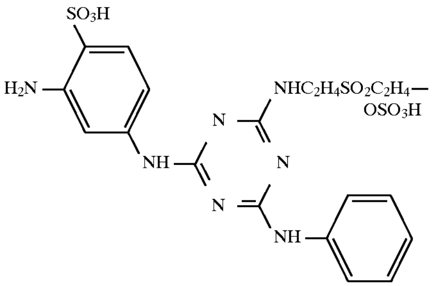 | " |

TABLE 15
| 1 | 2 | 3 | 4 | 5 | 6 |
|---|---|---|---|---|---|
| 6 | 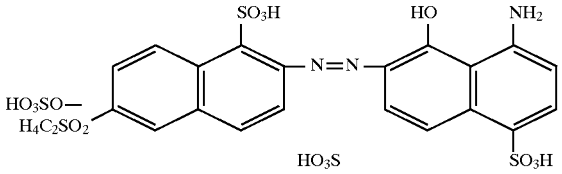 | 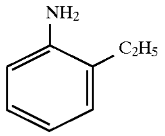 | 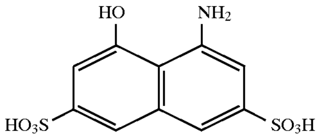 | 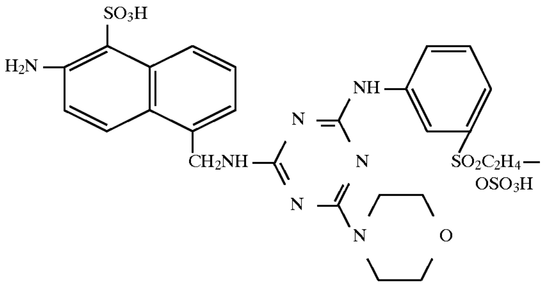 | Red |
| 7 | 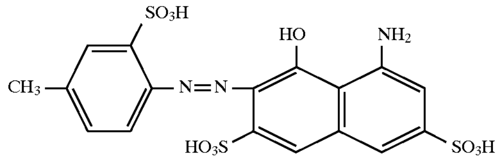 | 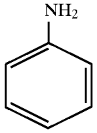 | 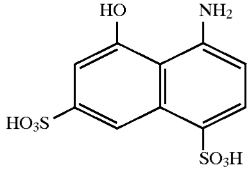 | 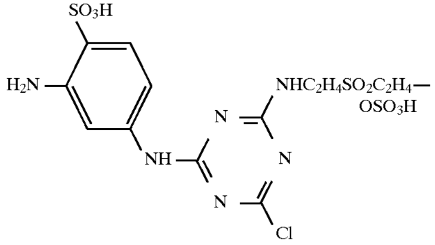 | " |
| 8 | 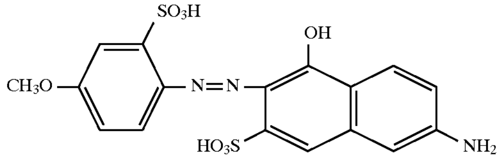 | " | 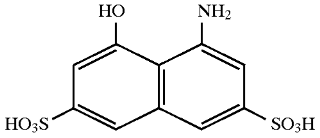 | " | " |

TABLE 15-continued
| 1 | 2 | 3 | 4 | 5 | 6 |
|---|---|---|---|---|---|
| 9 | " | 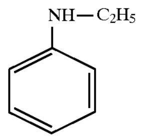 | " | 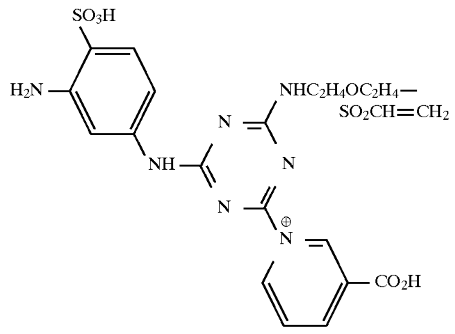 | " |
| 10 | 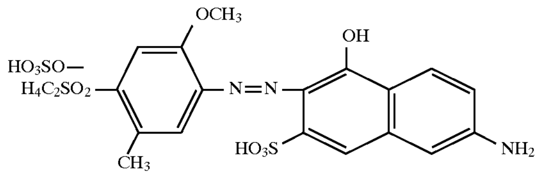 | 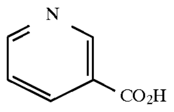 | " | 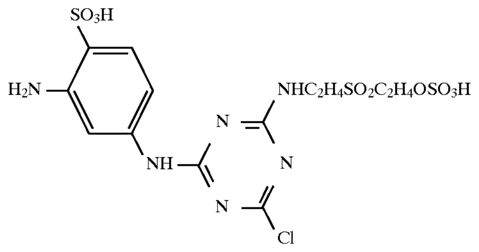 | " |

TABLE 16
| 1 | 2 | 3 | 4 | 5 | 6 |
| --- | --- | --- | --- | --- | --- |
| 11 | 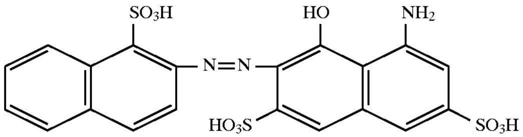 | 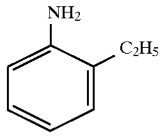 | 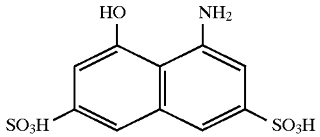 | 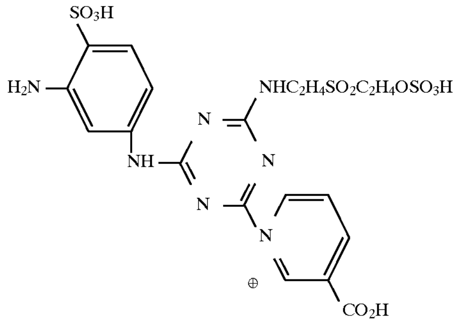 | Red |
| 12 | " | 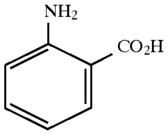 | " | 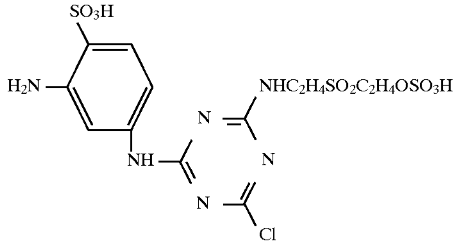 | " |
| 13 | " | 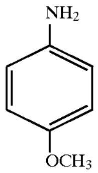 | 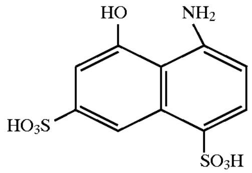 | " | " |
| 14 | 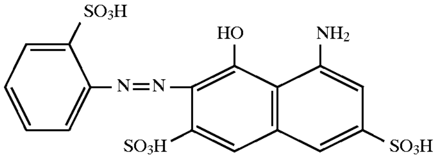 | " | 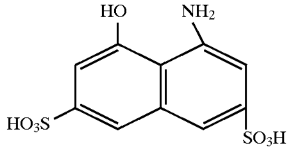 | " | " |

TABLE 16-continued
| 1 | 2 | 3 | 4 | 5 | 6 |
|---|---|---|---|---|---|
| 15 | " | $CH_2OH$ | " | 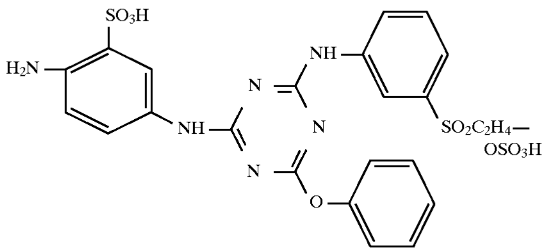 | " |

TABLE 17
| 1 | 2 | 3 | 4 | 5 | 6 |
|---|---|---|---|---|---|
| 16 | 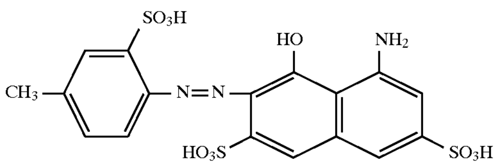 | 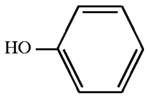 | 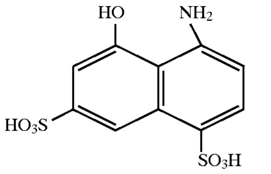 | 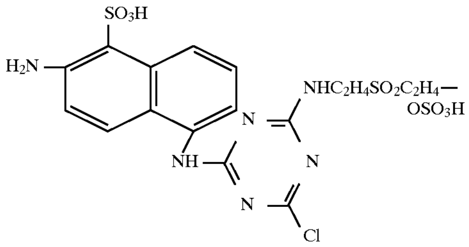 | Red |
| 17 | 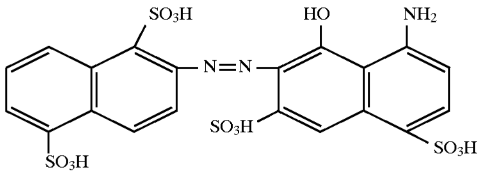 | 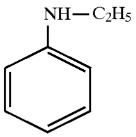 | " | " | " |
| 18 | " | 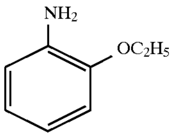 | 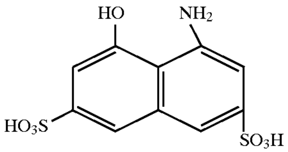 | 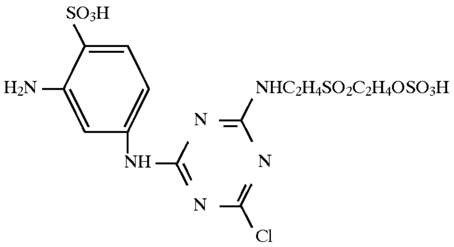 | " |
| 19 | 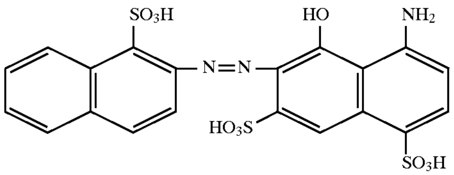 | 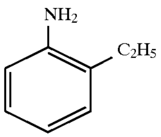 | " | " | " |

TABLE 17-continued
| 1 | 2 | 3 | 4 | 5 | 6 |
|---|---|---|---|---|---|
| 20 | " | 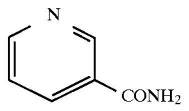 | 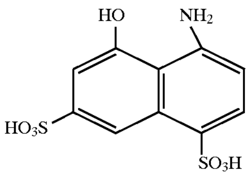 | " | " |

TABLE 18
| 1 | 2 | 3 | 4 | 5 | 6 |
|---|---|---|---|---|---|
| 21 | 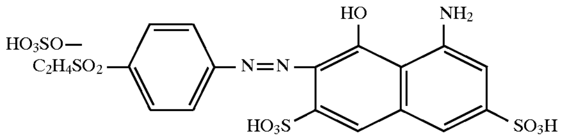 | 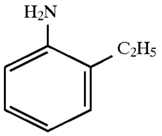 | 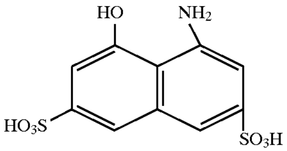 | 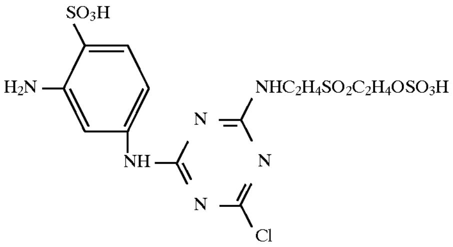 | Red |
| 22 | " | 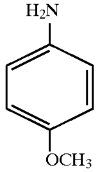 | " | " | " |
| 23 | " | 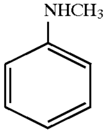 | " | " | " |
| 24 | " | $H_2NC_2H_4OH$ | " | " | " |
| 25 | " | 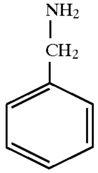 | " | " | " |

TABLE 19
| 1 | 2 | 3 | 4 | 5 | 6 |
|---|---|---|---|---|---|
| 26 | 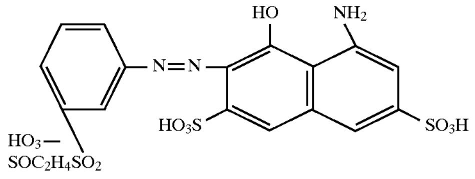 | 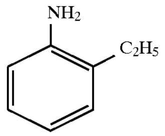 | 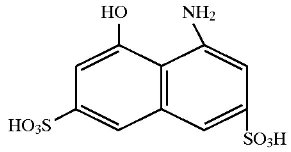 | 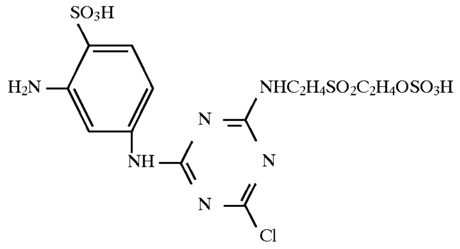 | Red |
| 27 | " | 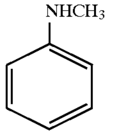 | " | " | " |
| 28 | 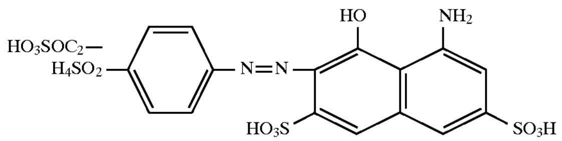 | $NH_3$ | " | " | " |
| 29 | " | 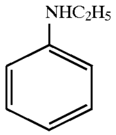 | " | " | " |
| 30 | " | 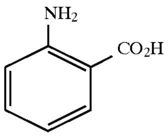 | " | " | " |

TABLE 20
| 1 | 2 | 3 | 4 | 5 | 6 |
|---|---|---|---|---|---|
| 31 | 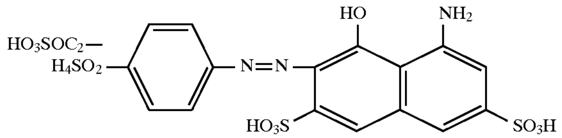 | 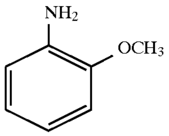 | 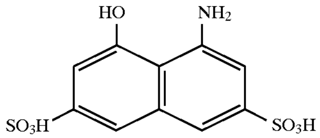 | 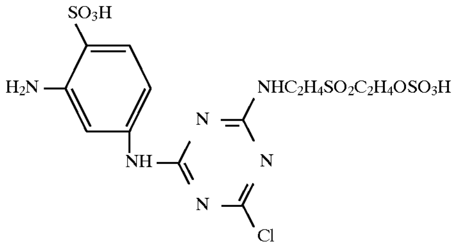 | Red |
| 32 | " | 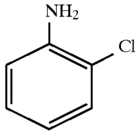 | " | " | " |
| 33 | " | 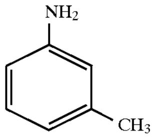 | " | " | " |
| 34 | " | 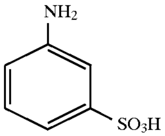 | " | " | " |
| 35 | " | 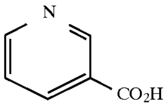 | " | " | " |

TABLE 21
| 1 | 2 | 3 | 4 | 5 | 6 |
|---|---|---|---|---|---|
| 36 | 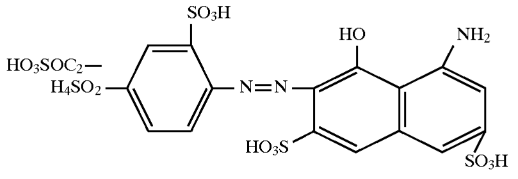 | 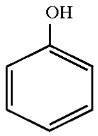 | 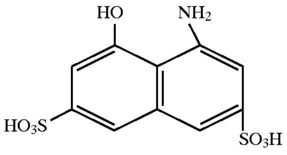 | 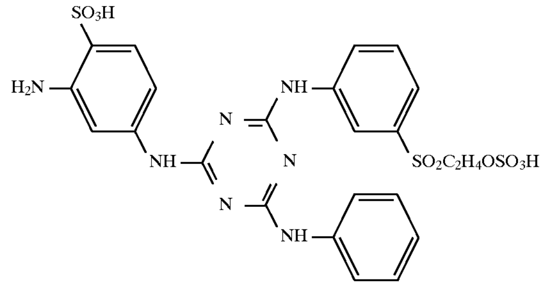 | Red |
| 37 | " | 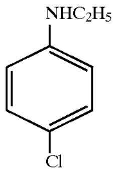 | " | 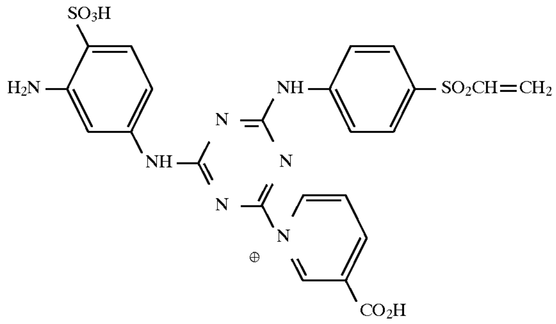 | " |
| 38 | 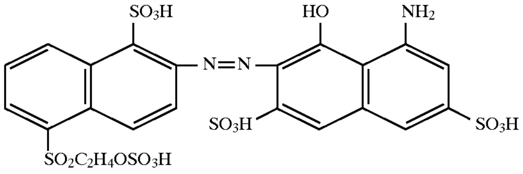 | 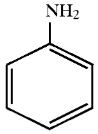 | 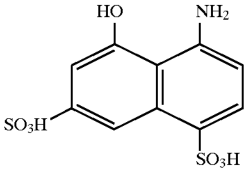 | 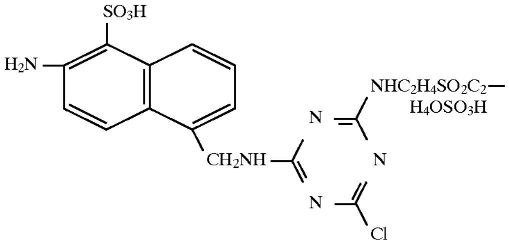 | " |

TABLE 21-continued
| 1 | 2 | 3 | 4 | 5 | 6 |
|---|---|---|---|---|---|
| 39 | 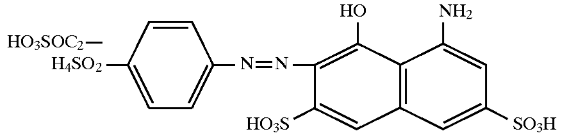 | $H_2O$ | 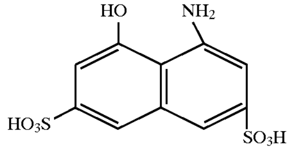 | 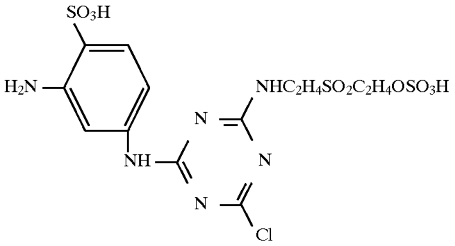 | " |
| 40 | 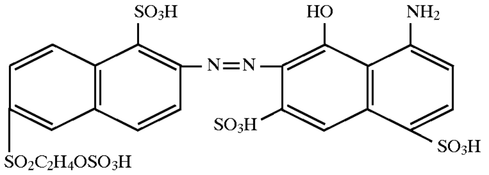 | 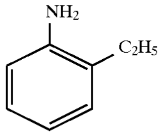 | " | 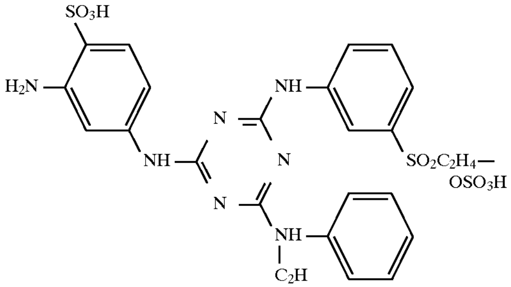 | " |

TABLE 22
| 1 | 2 | 3 | 4 | 5 | 6 |
|---|---|---|---|---|---|
| 41 | 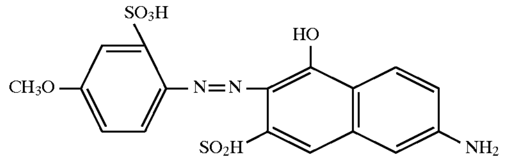 | 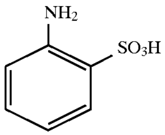 | 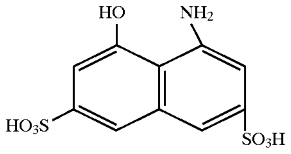 | 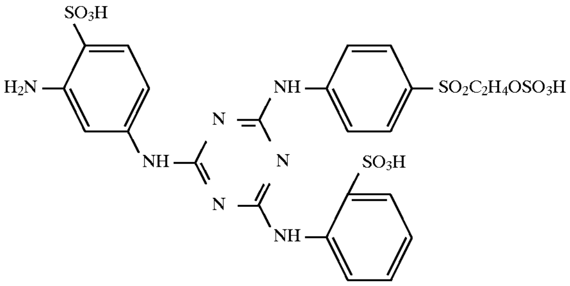 | Red |
| 42 | " | $C_2H_5OH$ | " | 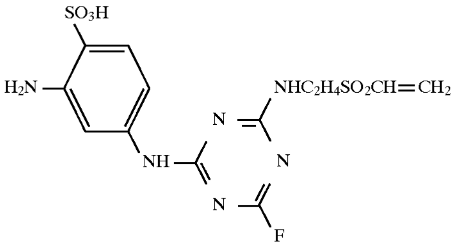 | " |
| 43 | 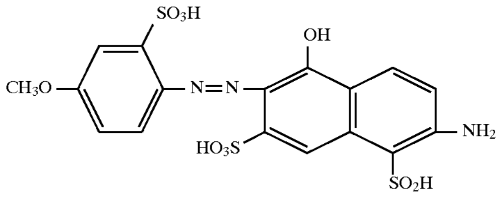 | 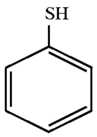 | " | 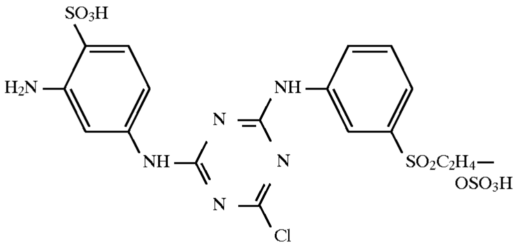 | " |
| 44 | 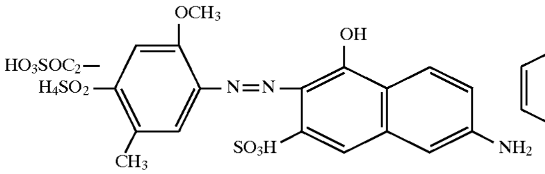 | 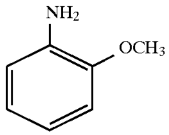 | " | " | " |

TABLE 22-continued
| 1 | 2 | 3 | 4 | 5 | 6 |
|---|---|---|---|---|---|
| 45 | " | 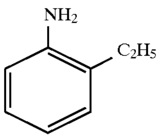 | 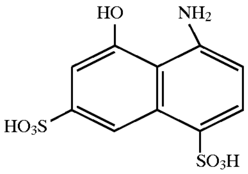 | 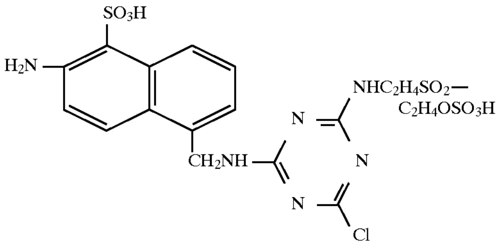 | " |

TABLE 23
| 1 | 2 | 3 | 4 | 5 | 6 |
|---|---|---|---|---|---|
| 46 | 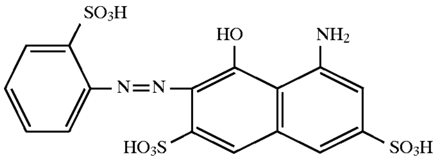 | 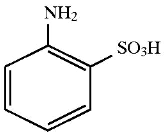 | 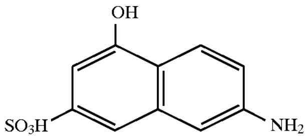 | 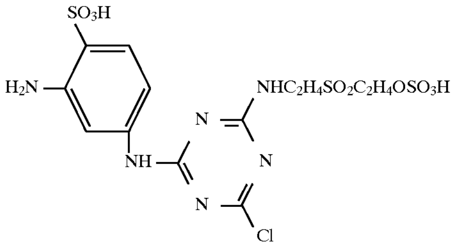 | Red |
| 47 | 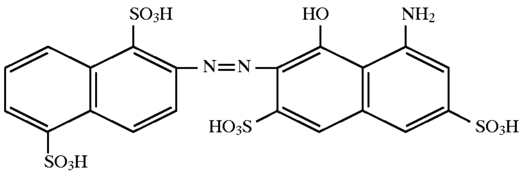 | 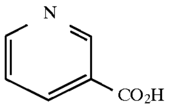 | " | " | " |
| 48 | 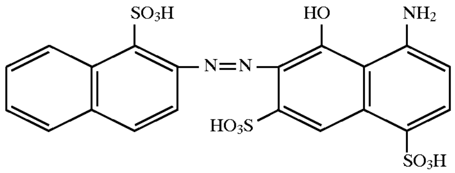 | 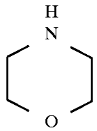 | 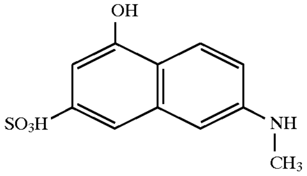 | " | " |
| 49 | 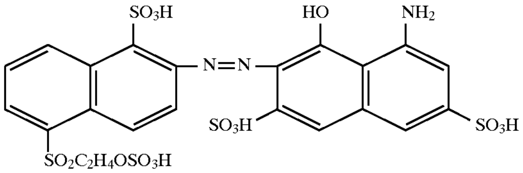 | 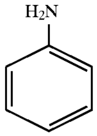 | 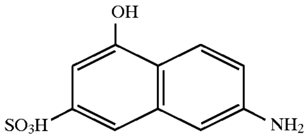 | " | " |

TABLE 23-continued
| 1 | 2 | 3 | 4 | 5 | 6 |
|---|---|---|---|---|---|
| 50 | 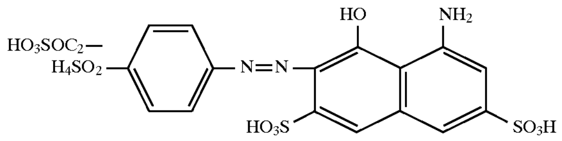 | 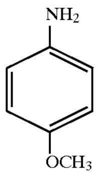 | " | 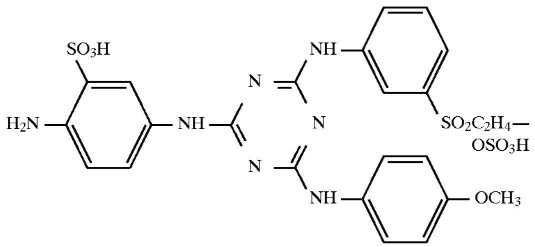 | " |

TABLE 24
| 1 | 2 | 3 | 4 | 5 | 6 |
|---|---|---|---|---|---|
| 51 | 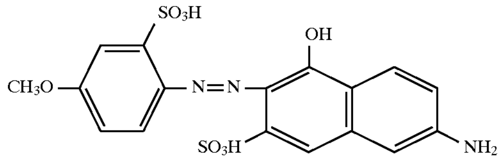 | 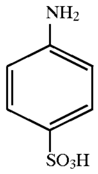 | 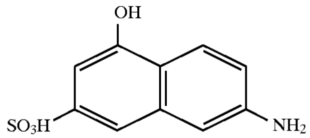 | 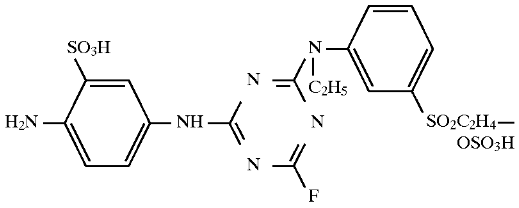 | Scarlet |
| 52 | " | 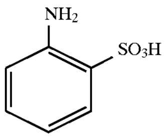 | " | 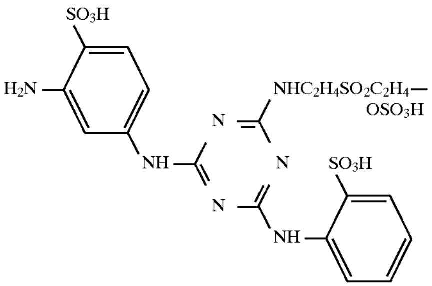 | " |
| 53 | " | 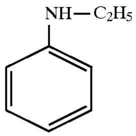 | 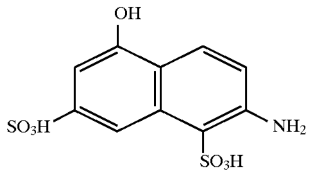 | 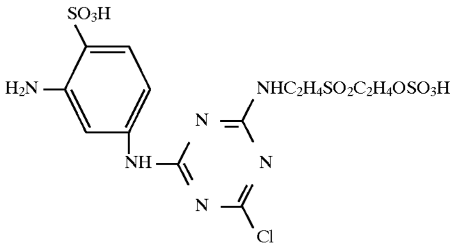 | " |
| 54 | 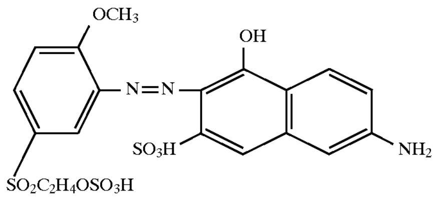 | 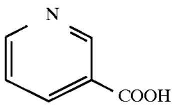 | 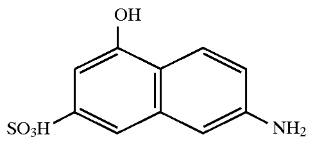 | " | " |

TABLE 24-continued
| 1 | 2 | 3 | 4 | 5 | 6 |
|---|---|---|---|---|---|
| 55 | 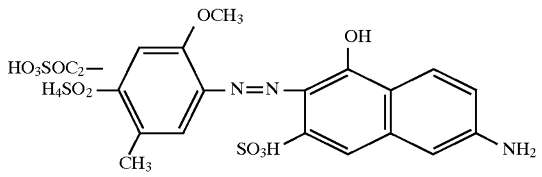 | 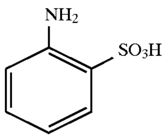 | " | " | " |

What is claimed is:

1. A bisazo compound represented by the following general formula (I) or its salt:

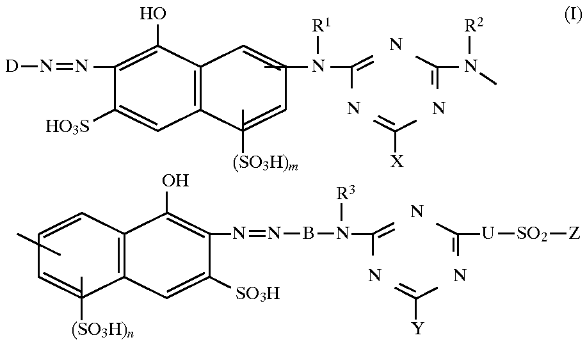

(I)

where m and n each independently represent 0 or 1; $R^1$, $R^2$ or $R^3$ each independently represent a hydrogen atom or an alkyl group which may be substituted, D represents a phenyl group which may be substituted or a naphthyl group which may be substituted, the substituent on the phenyl and naphthyl groups being a straight or branched alkyl group having 1 to 4 carbon atoms, an alkoxy group having 1 to 4 carbon atoms, a carboxy group, a sulfo group, a halogeno group, a nitro group, $—SO_2CH═CH_2—$, or $—SO_2CH_2CH_2Z^2—$, where $Z^2$ represents a group releasable under an alkali action; B represents a group represented by the following general formula (II) or (III):

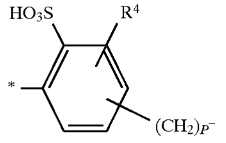

(II)

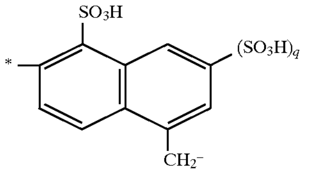

(III)

(where an asterisk * represents a bond linking to the azo group, $R^4$ represents a hydrogen atom, a lower alkyl group, a lower alkoxy group or a sulfo group; and p and q each independently represent 0 or 1), U represents a linking group represented by the following general formula (U1), (U2), (U3) or (U4):

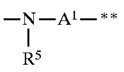

(U1)

-continued

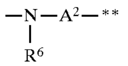

(U2)

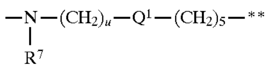

(U3)

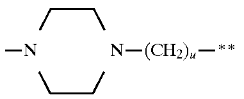

(U4)

(where $R^5$, $R^6$ and $R^7$ each independently represent a hydrogen atom or an alkyl group which may have a substituent; $A^1$ represents a phenylene group which may be substituted or a naphthylene group which may be substituted; $A^2$ represents an alkylene group which may be substituted; $Q^1$ represents —O—, —S— or $—NR^8—$, where $R^8$ represents a hydrogen atom, an alkyl group which may be substituted or a phenyl group which may be substituted; r and s each independently represent 2, 3 or 4; t represents an integer of 1 to 6; and a double asterisk ** represents a bond linking to $—SO_2Z$), Z represents —CH═CH, or $—CH_2CH_2Z^1$, where $Z^1$ represents a group releasable under an alkali action; and X and Y each independently represent a halogen atom, a pyridinio group which may be substituted or a group represented by the following general formula (Y1), (Y2), (Y3) or (Y4):

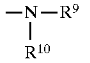

(Y1)

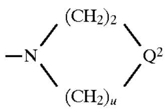

(Y2)

$—O—R^{11}$ (Y3)

$—S—R^{12}$ (Y4)

(where $R^9$, $R^{10}$, $R^{11}$ and $R^{12}$ each independently represent a hydrogen atom, an alkyl group which may be substituted, a cyclohexyl group which may be substituted, a phenyl group which may be substituted or a naphthyl group which may be substituted; $Q^2$ represents $—CH_2—$, —O—, —S—, $—SO_2—$ or $—NR^{13}—$, where $R^{13}$ represents a hydrogen atom or an alkyl group which may be substituted; and u represents 1, 2 or 3).

2. A bisazo compound represented by the following general formula (I') or its salts:

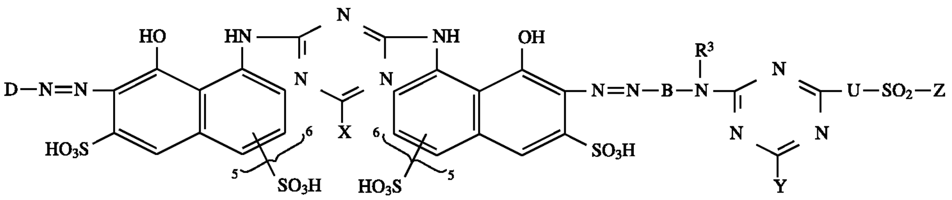

(I')

where $R^3$ represents a hydrogen atom or an alkyl group which may be substituted; D represents a phenyl group which may be substituted or a naphthyl group which may be substituted; B represents a group represented by the following general formula (II) or (III):

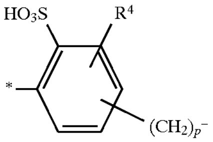

(II)

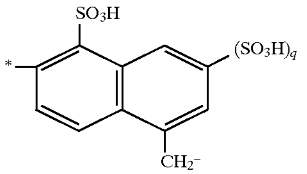

(III)

(where an asterisk * represents a bond linking to the azo group; $R^4$ represents a hydrogen atom, a lower alkyl group, a lower alkoxy group or a sulfo group; and p and q each independently represent 0 or 1), U represents a linking group represented by the following general formula (U1), (U2), (U3) or (U4):

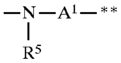

(U1)

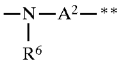

(U2)

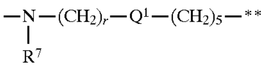

(U3)

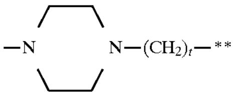

(U4)

(where $R^5$, $R^6$ and $R^7$ each independently represent a hydrogen atom or a alkyl group which may be substituted; $A^1$ represents a phenylene group which may be substituted or a naphthylene group which may be substituted; $A^2$ represents an alkylene group which may be substituted; $Q^1$ represents —O—, —S— or —$NR^8$, where $R^8$ represents a hydrogen atom, or alkyl group which may be substituted or a phenyl group which may be substituted; r and s each independently represent 2, 3 or 4; t represents an integer of 1 to 6; and a double asterisk ** represent a bond linking to —$SO_2Z$), Z represents —CH=$CH_2$ or —$CH_2CH_2Z^1$, where $Z^1$ represents a group removable by the action of an alkali; and X and Y each independently represent a halogen atom, a pyridinio group which may be substituted or a group represented by the following general formula (Y1), (Y2), (Y3) or (Y4):

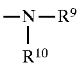

(Y1)

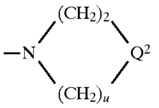

(Y2)

$-O-R^{11}$ (Y3)

$-S-R^{12}$ (Y4)

(where $R^9$, $R^{10}$, $R^{11}$ and $R^{12}$ each independently represent a hydrogen atom, an alkyl group which may be substituted, a cyclohexyl group which may be substituted, a phenyl group which may be substituted or a naphthyl group which may be substituted; $Q^2$ represents —$CH_2$—, —O—, —S—, —$SO_2$— or —$NR^{13}$—, where $R^{13}$ represents a hydrogen atom or an alkyl group which may be substituted; and u represents 1, 2 or 3).

3. A bisazo compound or its salt according to claim 1 or 2, wherein at least one of X and Y is a pyridinio group which may be substituted, or a group represented by the general formula(Y1), (Y2), (Y3) or (Y4).

4. A bisazo compound or its salt according to claim 1 or 2, wherein D is a phenyl or naphthyl group having —$SO_2CH$=CH or —$SO_2CH_2CH_2Z^2$ as a substituent, where $Z^2$ represents a group removable by the action of an alkali, which may have a further substituent.

5. A bisazo compound or its salt according to claim 1 or 2, wherein X is a group represented by the general formula (Y1) and one of $R^9$ and $R^{10}$ is a hydrogen atom, methyl or ethyl, while the other is a phenyl group which may be substituted.

6. A bisazo compound or its salt according to claim 1 or 2, wherein X is a group represented by the general formula (Y3) and $R^{11}$ is a hydrogen atom, methyl or ethyl.

7. A bisazo compound or its salt according to claim 1 or 2, wherein Y is fluoro or chloro.

8. A bisazo compound or its salt according to claim 1 or 2, wherein Y is a pyridinio group having a carboxy group or a carbamoyl group.

9. A bisazo compound or its salt according to claim 1 or 2, wherein Y is a group represented by the general formula (Y1) and one of $R^9$ and $R^{10}$ is a hydrogen atom, methyl or ethyl, while the other is a phenyl group which may be substituted.

10. A bisazo compound or its salt according to claim 1 or 2, wherein U is a group represented by the general formula (U1) or (U2).

11. A bisazo compound or its salt according to claim 10, wherein U is a group represented by the general formula (U2).

12. A bisazo compound or its salt according to claim 1 or 2, wherein U is a group represented by the general formula (U2), $A^2$ is ethylene or trimethylene and $R^6$ is a hydrogen atom.

13. A bisazo compound or its salt according to claim 1 or 2, wherein B is a group represented by the general formula (II), $R^4$ is a hydrogen atom and p is 0.

14. A bisazo compound or its salt according to claim 1, wherein $R^1$, $R^2$ and $R^3$ each independently are a hydrogen atom, methyl or ethyl.

15. A bisazo compound or it salt according to claim 2, wherein $R^3$ is a hydrogen atom, methyl or ethyl.

16. A bisazo compound or its salt according to claim 1 or 2, wherein Z is —CH=$CH_2$ or —$CH_2CH_2OSO_3H$.

17. A method for dyeing or printing fibrous materials which comprises applying thereto a bisazo compound or its salt according to claim 1 or 2.

* * * * *

UNITED STATES PATENT AND TRADEMARK OFFICE

CERTIFICATE OF CORRECTION

PATENT NO. : 5,886,159

DATED : March 23, 1999

INVENTOR(S) : Nobutaka KUNIMI et al

It is certified that error appears in the above-identified patent and that said Letters Patent is hereby corrected as shown below:

**On the cover page of the patent, at [45], please delete "*"; and**

**delete "[*] Notice: The term of this patent shall not extend beyond the expiration date of Pat. No. 5,145,842"**

Signed and Sealed this

Twelfth Day of October, 1999

*Attest:*

Q. TODD DICKINSON

*Attesting Officer*

*Acting Commissioner of Patents and Trademarks*

UNITED STATES PATENT AND TRADEMARK OFFICE
CERTIFICATE OF CORRECTION

PATENT NO. : 5,886,159

DATED : March 23, 1999

INVENTOR(S) : Nobutaka Kunimi, Kouji Toishi

It is certified that error appears in the above-identified patent and that said Letters Patent is hereby corrected as shown below:

In formula (I''') in columns 17-18, the tetrahydronaphthalene ring should be a fully unsaturated naphthalene ring, thus, the formula should appear as follows:

(I''')

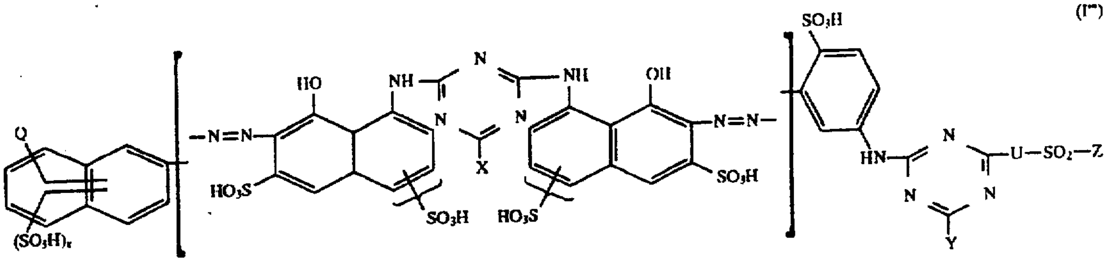

In the formula in columns 59-60, entry 37, item 4, the tetravalent Et-bearing N should be trivalent, thus, the formula should appear as follows:

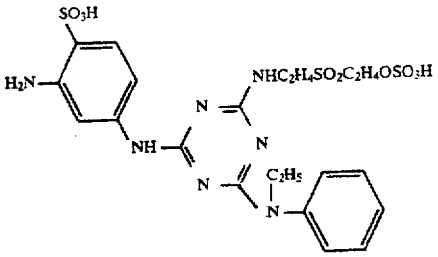

UNITED STATES PATENT AND TRADEMARK OFFICE

CERTIFICATE OF CORRECTION

PATENT NO. : 5,886,159

DATED : March 23, 1999

INVENTOR(S) : Nobutaka Kunimi, Kouji Toishi

It is certified that error appears in the above-identified patent and that said Letters Patent is hereby corrected as shown below:

In the formula in column 67, entry 46, item 3, $NH_3S$ should be $HO_3S$, thus, the formula should appear as follows:

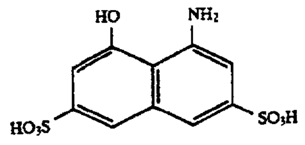

In the formula in columns 71-72, entry 52, item 4, $SO_3CH=CH_2$ should be $SO_2CH=CH_2$, thus the formula should appear as follows:

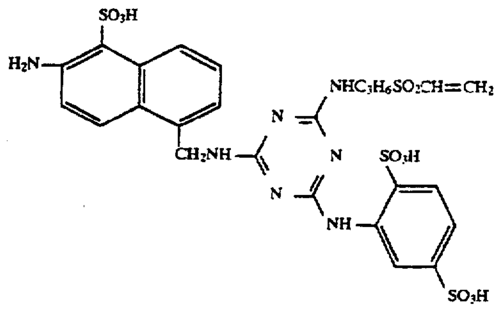

UNITED STATES PATENT AND TRADEMARK OFFICE

CERTIFICATE OF CORRECTION

PATENT NO. : 5,886,159

DATED : March 23, 1999

INVENTOR(S) : Nobutaka Kunimi, Kouji Toishi

It is certified that error appears in the above-identified patent and that said Letters Patent is hereby corrected as shown below:

In the formula in column 83, entry 1, item 5, $SO_8$ should be $SO_2$, thus the formula should appear as follows:

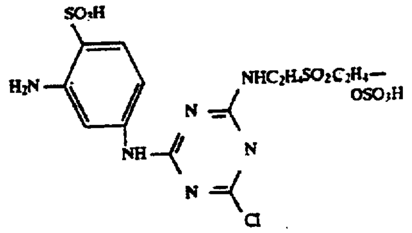

UNITED STATES PATENT AND TRADEMARK OFFICE

CERTIFICATE OF CORRECTION

PATENT NO. : 5,886,159

DATED : March 23, 1999

INVENTOR(S) : Nobutaka Kunimi, et al

It is certified that error appears in the above-identified patent and that said Letters Patent is hereby corrected as shown below:

In the formula in column 87, entry 6, item 2, the floating $HO_3S$ group should be orthogonal to the azo group on the right naphthalene ring, thus, the formula should appear as follows:

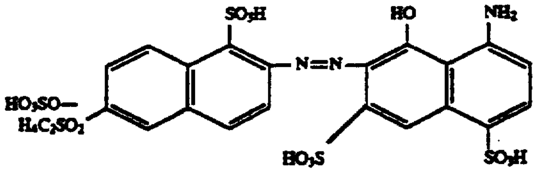

Signed and Sealed this

Thirtieth Day of January, 2001

Attest:

Q. TODD DICKINSON

*Attesting Officer* *Director of Patents and Trademarks*